(12) United States Patent
Cariou et al.

(10) Patent No.: US 10,966,182 B2
(45) Date of Patent: *Mar. 30, 2021

(54) PARAMETER ENCODING TECHNIQUES FOR WIRELESS COMMUNICATION NETWORKS

(71) Applicant: INTEL CORPORATION, Santa Clara, CA (US)

(72) Inventors: Laurent Cariou, Portland, OR (US); Carlos Cordeiro, Portland, OR (US)

(73) Assignee: INTEL CORPORATION, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/420,379

(22) Filed: May 23, 2019

(65) Prior Publication Data

US 2019/0320425 A1 Oct. 17, 2019

Related U.S. Application Data

(63) Continuation of application No. 15/283,390, filed on Oct. 1, 2016, now Pat. No. 10,356,759.

(60) Provisional application No. 62/307,332, filed on Mar. 11, 2016.

(51) Int. Cl.
*H04W 72/04* (2009.01)
*H04W 84/12* (2009.01)

(52) U.S. Cl.
CPC .... *H04W 72/0406* (2013.01); *H04W 72/0453* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 2008/0137718 A1* | 6/2008 | Cha | H04W 72/0453 |
| | | | 375/146 |
| 2012/0209615 A1* | 8/2012 | Thesing | G10L 19/008 |
| | | | 704/500 |
| 2015/0124739 A1* | 5/2015 | Baik | H04W 72/0453 |
| | | | 370/329 |
| 2015/0382200 A1* | 12/2015 | Li | H04W 16/10 |
| | | | 370/336 |
| 2016/0295581 A1* | 10/2016 | Ghosh | H04L 5/0092 |
| 2016/0315681 A1* | 10/2016 | Moon | H04B 7/0452 |
| 2017/0034847 A1* | 2/2017 | He | H04W 74/06 |
| 2018/0375632 A1* | 12/2018 | Kim | H04L 5/0023 |
| 2018/0376423 A1* | 12/2018 | Atefi | H04W 52/146 |

* cited by examiner

*Primary Examiner* — Gregory B Sefcheck
*Assistant Examiner* — Srinivasa R Reddivalam
(74) *Attorney, Agent, or Firm* — Kacvinsky Daisak Bluni PLLC

(57) ABSTRACT

Various embodiments are generally directed to parameter encoding techniques for wireless communication networks. In various embodiments, a transmitting device may communicate a plurality of wireless communication parameter values using a single index value comprised in a field of a header or frame. In various embodiments, a receiving device may use the index value to identify the plurality of wireless communication parameter values by consulting mapping information specifying mappings of possible index values to respective sets of parameter values. In some embodiments, the mapping information may specify mappings associated with a defined mapping scheme.

20 Claims, 10 Drawing Sheets

| BW | BW combinations | | | | |
|---|---|---|---|---|---|
| | channel 1 | channel 2 | channel 3 | channel 4 | |
| 2.16GHz | | | | | |
| 4.32GHz | channel 9 primary channel 1 1+(4.32 offset) | channel 9 primary channel 2 3+(2.32 offset) | channel 11 primary channel 3 3+(4.32 offset) | channel 11 primary channel 4 4+(4.32 offset) | |
| 6.48GHz | Channel 17 primary channel 1 1+(6.48 offset) | Channel 17 primary channel 2 3+(6.48 offset) | Channel 17 primary channel 3 3+(6.48 offset) | | |
| 8.64GHz | Channel 25 primary channel 1 1+(8.64 offset) | Channel 25 primary channel 2 3+(8.64 offset) | Channel 25 primary channel 3 4+(8.64 offset) | Channel 25 primary channel 4 4+(8.64 offset) | |
| 2.16+2.16GHz | Channel 1 and 2 primary channel 1 1+(2+2 offset) | Channel 1 and 2 primary channel 2 3+(2+2 offset) | Channel 1 and 3 primary channel 1 3+(2+2 offset) | Channel 1 and 3 primary channel 3 3+(2+2 offset) | Channel 1 and 4 primary channel 1 3+(2+2 offset) | Channel 1 and 4 primary channel 4 3+(2+2 offset) |
| 2.16+2.16GHz | Channel 2 and 3 primary channel 2 3+(2+2 offset) | Channel 2 and 3 primary channel 3 3+(2+2 offset) | Channel 2 and 4 primary channel 2 3+(2+2 offset) | Channel 2 and 4 primary channel 4 3+(2+2 offset) | Channel 3 and 4 primary channel 3 3+(2+2 offset) | Channel 3 and 4 primary channel 4 3+(2+2 offset) |

PARAMETER ENCODING TECHNIQUES FOR WIRELESS COMMUNICATION NETWORKS

RELATED CASE

This application is a continuation of, claims the benefit of and priority to previously filed U.S. patent application Ser. No. 15/283,390, filed Oct. 1, 2016, entitled "PARAMETER ENCODING TECHNIQUES FOR WIRELESS COMMUNICATION NETWORKS", which claims the benefit of and priority to previously filed U.S. Provisional Patent Application No. 62/307,332, filed Mar. 11, 2016, which are hereby incorporated by reference in their entireties.

TECHNICAL FIELD

Embodiments described herein generally relate to wireless communications between devices in wireless networks.

BACKGROUND

In a given wireless communication network, a wireless communication device may have the option of communicating via one of multiple possible bandwidths and/or one or more of multiple possible portions of wireless spectrum within a system bandwidth. Such a wireless communication device may also have the option of designating/utilizing one of multiple possible channels as a primary channel. In order to enable successful communication with other devices in the wireless network, the wireless communication device may need to notify such other devices of the bandwidth and particular portions of wireless spectrum that it is using, as well as the primary channel that it is using.

BRIEF DESCRIPTION OF THE DRAWINGS

FIG. 4 illustrates an embodiment of a mapping scheme.

DETAILED DESCRIPTION

Figure 1:
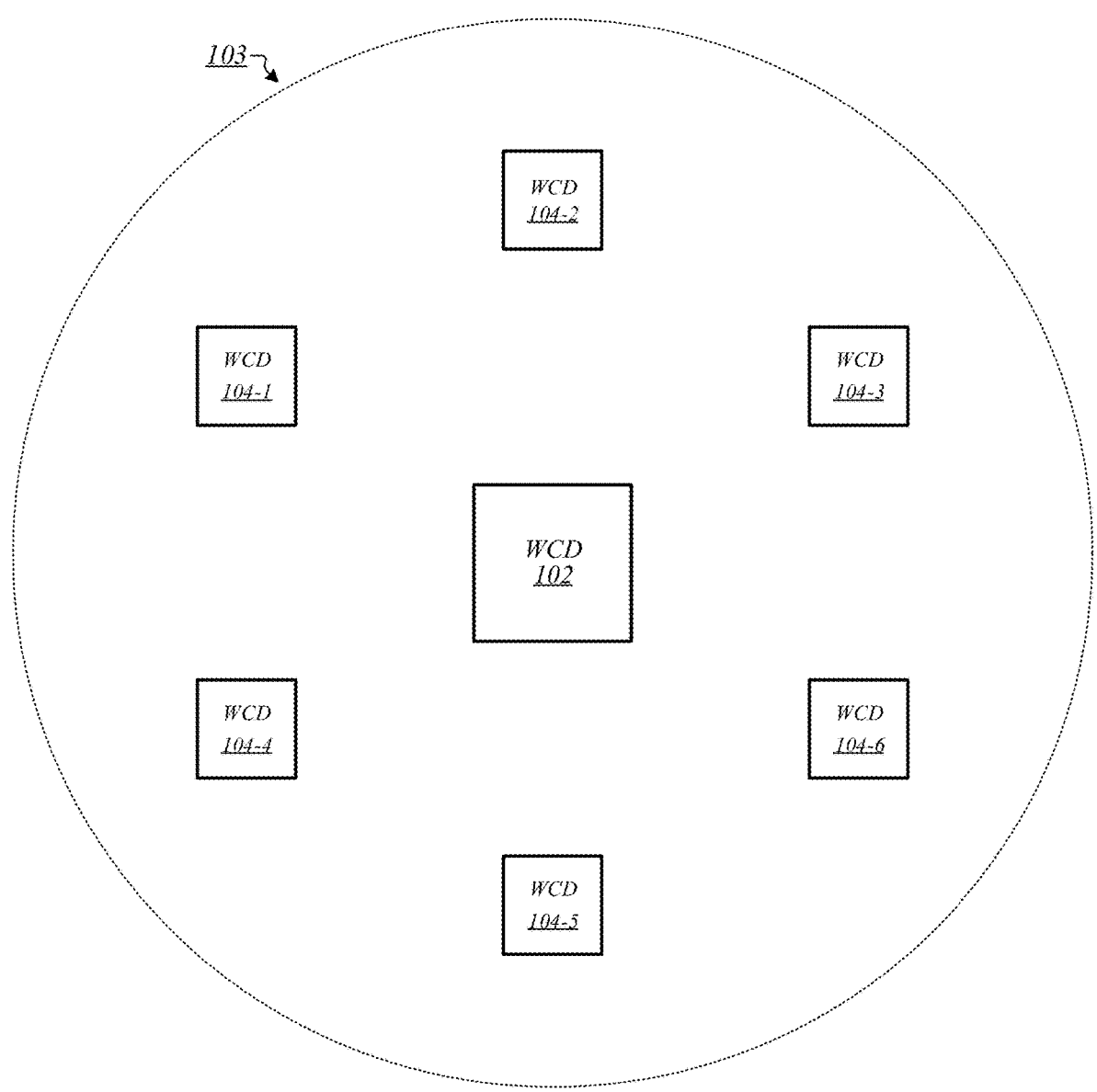
FIG. 1 illustrates an embodiment of a first operating environment.

Various embodiments are generally directed to parameter encoding techniques for wireless communication networks. In various embodiments, a transmitting device may communicate a plurality of wireless communication parameter values using a single index value comprised in a field of a header or frame. In various embodiments, a receiving device may use the index value to identify the plurality of wireless communication parameter values by consulting mapping information specifying mappings of possible index values to respective sets of parameter values. In some embodiments, the mapping information may specify mappings associated with a defined mapping scheme.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Various embodiments herein are generally directed to wireless communications systems. Some embodiments are particularly directed to wireless communications over 60 GHz frequencies. Various such embodiments may involve wireless communications performed according to one or more standards for 60 GHz wireless communications. For example, some embodiments may involve wireless communications performed according to one or more Wireless Gigabit Alliance ("WiGig")/Institute of Electrical and Electronics Engineers (IEEE) 802.11ad standards, such as the IEEE 802.11ad-2012 standard published Dec. 28, 2012, including their predecessors, revisions, progeny, and/or variants. Various embodiments may involve wireless communications performed according to one or more "next-generation" 60 GHz ("NG60") wireless local area network (WLAN) communications standards, such as the IEEE 802.11ay standard that is currently under development. Some embodiments may involve wireless communications performed according to one or more millimeter-wave (mm-Wave) wireless communication standards. It is worthy of note that the term "60 GHz," as it is employed in reference to various wireless communications devices, wireless communications frequencies, and wireless communications standards herein, is not intended to specifically denote a frequency of exactly 60 GHz, but rather is intended to generally refer to frequencies in, or near, the 57 GHz to 64 GHz frequency band or any nearby unlicensed band. The embodiments are not limited in this context.

Various embodiments may additionally or alternatively involve wireless communications according to one or more other wireless communication standards. Some embodiments may involve wireless communications performed according to one or more broadband wireless communication standards. For example, various embodiments may involve wireless communications performed according to one or more 3rd Generation Partnership Project (3GPP), 3GPP Long Term Evolution (LTE), and/or 3GPP LTE-Advanced (LTE-A) technologies and/or standards, including their predecessors, revisions, progeny, and/or variants. Additional examples of broadband wireless communication technologies/standards that may be utilized in some embodiments may include—without limitation—Global System for Mobile Communications (GSM)/Enhanced Data Rates for GSM Evolution (EDGE), Universal Mobile Telecommunications System (UMTS)/High Speed Packet Access (HSPA), and/or GSM with General Packet Radio Service (GPRS) system (GSM/GPRS), IEEE 802.16 wireless broadband standards such as IEEE 802.16m and/or IEEE 802.16p, International Mobile Telecommunications Advanced (IMT-ADV), Worldwide Interoperability for Microwave Access (WiMAX) and/or WiMAX II, Code Division Multiple Access (CDMA) 2000 (e.g., CDMA2000 1×RTT, CDMA2000 EV-DO, CDMA EV-DV, and so forth), High Performance Radio Metropolitan Area Network (HIPERMAN), Wireless Broadband (WiBro), High Speed Downlink Packet Access (HSDPA), High Speed Orthogonal Frequency-Division Multiplexing (OFDM) Packet Access (HSOPA), High-Speed Uplink Packet Access (HSUPA) technologies and/or standards, including their predecessors, revisions, progeny, and/or variants.

Further examples of wireless communications technologies and/or standards that may be used in various embodiments may include—without limitation—other IEEE wireless communication standards such as the IEEE 802.11, IEEE 802.11a, IEEE 802.11b, IEEE 802.11g, IEEE 802.11n, IEEE 802.11u, IEEE 802.11ac, IEEE 802.11af, and/or IEEE 802.11ah standards, High-Efficiency Wi-Fi standards developed by the IEEE 802.11 High Efficiency WLAN (HEW) Study Group and/or IEEE 802.11 Task Group (TG) ax, Wi-Fi Alliance (WFA) wireless communication standards such as Wi-Fi, Wi-Fi Direct, Wi-Fi Direct Services, WiGig Display Extension (WDE), WiGig Bus Extension (WBE), WiGig Serial Extension (WSE) standards and/or standards developed by the WFA Neighbor Awareness Networking (NAN) Task Group, machine-type communications (MTC) standards such as those embodied in 3GPP Technical Report (TR) 23.887, 3GPP Technical Specification (TS) 22.368, and/or 3GPP TS 23.682, and/or near-field communication (NFC) standards such as standards developed by the NFC Forum, including any predecessors, revisions, progeny, and/or variants of any of the above. The embodiments are not limited to these examples.

FIG. 1 illustrates an example of an operating environment 100 such as may be representative of various embodiments. In operating environment 100, a wireless communication device (WCD) 102 may wirelessly communicate in a wireless network 103. Wireless communication devices 104-1, 104-2, 104-3, 104-4, 104-5, and 104-6 may also wirelessly communicate in wireless network 103 and/or with wireless communication device 102. In various embodiments, wireless network 103 may comprise a wireless network that utilizes wireless channel frequencies of the 60 GHz band. In some embodiments, wireless communication devices within wireless network 103 may communicate with each other according to one or more standards for 60 GHz wireless communications. For example, in various embodiments, devices within wireless network 103 may communicate with each other according to one or more protocols and/or procedures defined in IEEE 802.11ad-2012, and/or its predecessors, revisions, progeny, and/or variants. In some embodiments, wireless communication devices 102, 104-1, 104-2, 104-3, 104-4, and 104-5 may comprise 60 GHz-capable stations (STAs) such as Directional Multi-Gigabit (DMG) stations (STAs). In various embodiments, some or all of the wireless communication devices within wireless network 103 may communicate with each other according to one or more protocols and/or procedures that may be defined in the IEEE 802.11ay standard that is currently under development. In some embodiments, wireless communication device 102 may operate as a personal basic service set (PBSS) control point/access point (PCP/AP). The embodiments are not limited in this context.

Figure 2:
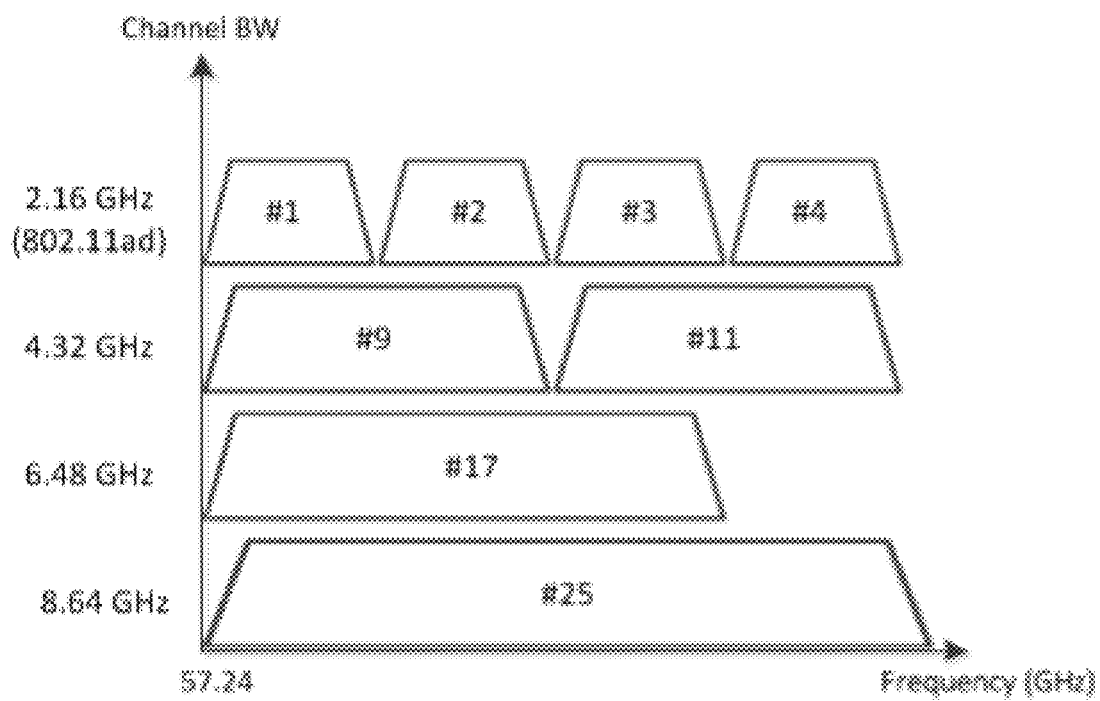
FIG. 2 illustrates an embodiment of a channelization scheme.

FIG. 2 illustrates an example of a channelization scheme 200 that may be representative of a channelization scheme that may be utilized by a wireless communication protocol implemented in wireless network 103 of FIG. 1 according to various embodiments. As shown in FIG. 2, according to channelization scheme 200, wireless spectrum of a 60 GHz frequency band may be utilized to implement 2.16 GHz, 4.32 GHz, 6.48 GHz, and 8.64 GHz wireless communication bandwidths. A 2.16 GHz bandwidth may be implemented using any one of four different portions of the 60 GHz frequency band. In this example, these four portions of wireless spectrum correspond to wireless channels 1, 2, 3, and 4. In various embodiments, these four portions of wireless spectrum may correspond to portions of wireless spectrum used to implement 2.16 GHz bandwidths according to IEEE 802.11ad-2012. A 4.32 GHz bandwidth may be implemented using either of two different portions of the 60 GHz frequency band. In this example, these two portions of wireless spectrum correspond to wireless channels 9 and 11. In this example, the portion of wireless spectrum to be used to implement a 6.48 GHz bandwidth corresponds to channel 17, and the portion of wireless spectrum to be used to implement an 8.64 GHz bandwidth corresponds to wireless channel 25. The embodiments are not limited to this example.

Returning to FIG. 1, in some embodiments, wireless communication device 102 may select/determine a bandwidth to use in conjunction with wirelessly communicating with another device in wireless network 103. In the context of this wireless communication, the selected/determined bandwidth may be referred to as the "communication bandwidth." In various embodiments, wireless communication device 102 may be capable of wirelessly communicating according to multiple different bandwidths defined by a channelization scheme of wireless network 103, and may select/determine the communication bandwidth from among those multiple possible bandwidths. For example, in some embodiments in which wireless network 103 implements a wireless communication protocol utilizing channelization scheme 200 of FIG. 2, wireless communication device 102 may be capable of wirelessly communicating via each of a 2.16 GHz bandwidth, a 4.32 GHz bandwidth, a 6.48 GHz bandwidth, and an 8.64 GHz bandwidth, and may select the communication bandwidth from among those possible bandwidths. In various other embodiments, wireless communication device 102 may only be capable of wirelessly communicating via one bandwidth utilized by a channelization scheme of wireless network 103, and may determine the communication bandwidth as that one bandwidth. For example, in some embodiments in which wireless network 103 implements a wireless communication protocol utilizing channelization scheme 200 of FIG. 2, wireless communication device 102 may only be capable of wirelessly communicating via a 2.16 GHz bandwidth, and may thus identify 2.16 GHz as the communication bandwidth. The embodiments are not limited to these examples.

In various embodiments, in addition to selecting/determining the communication bandwidth, wireless communication device 102 may select/determine a particular wireless channel to be used for the wireless communication. This particular wireless channel may be referred to as the "transmission channel" in the context of that wireless communication. Depending on the selected/determined bandwidth, wireless communication device 102 may or may not be able to select the transmission channel from among multiple possible wireless channels. For example, according to channelization scheme 200, if wireless communication device 102 is to communicate via a 4.32 GHz bandwidth, it may be able to choose either wireless channel 9 or wireless channel 11 as the transmission channel. On the other hand, if wireless communication device 102 is to communicate via an 8.64 GHz bandwidth, wireless channel 25 may be the only wireless channel that it can use as the transmission channel. The embodiments are not limited in this context.

In some embodiments, in addition to selecting/determining the communication bandwidth and the transmission channel, wireless communication device 102 may need to select/determine a primary channel. In various embodiments, the primary channel may comprise a 2.16 GHz wireless channel. In some embodiments, regardless of the selected/determined communication bandwidth, wireless communication device 102 may need to select/determine a 2.16 GHz wireless channel as the primary channel. In various embodiments, if the selected/determined communication bandwidth is 2.16 GHz, then the selected/determined transmission channel may also comprise the primary channel. For example, in the context of channelization scheme 200 of FIG. 2, if wireless channel 2 is selected/determined as the transmission channel, then wireless channel 2 may also constitute the primary channel. In some embodiments, if wireless communication device 102 is to communicate via a bandwidth greater than 2.16 GHz, then multiple 2.16 GHz wireless channels may be usable as the primary channel, and wireless communication device 102 may select/determine the primary channel from among those multiple 2.16 GHz wireless channels. For example, in the context of channelization scheme 200 of FIG. 2, if wireless communication device 102 is to communicate via a 6.48 GHz bandwidth, and thus the transmission channel is wireless channel 17, then wireless communication device 102 may select/determine the primary channel from among wireless channels 1, 2, and 3. The embodiments are not limited to these examples.

In various embodiments, wireless communication device 102 may be capable of wirelessly communicating according to a "2.16 GHz+2.16 GHz" mode. In some embodiments, according to the 2.16 GHz+2.16 GHz mode, wireless communication device 102 may communicate via a communication bandwidth of 4.32 GHz, using two 2.16 GHz transmission channels. In various embodiments, the two 2.16 GHz transmission channels may comprise non-contiguous wireless channels. In an example embodiment, in the context of channelization scheme 200 of FIG. 2, wireless communication device 102 may communicate via wireless channels 1 and 3 when utilizing the 2.16 GHz+2.16 GHz mode. In some embodiments, when utilizing the 2.16 GHz+2.16 GHz mode, wireless communication device 102 may select/determine the primary channel as one of the two transmission channels. For example, in the aforementioned scenario in which wireless communication device 102 may communicate via wireless channels 1 and 3 when utilizing the 2.16 GHz+2.16 GHz mode, it may select/determine either wireless channel 1 or wireless channel 3 as the primary channel. The embodiments are not limited to these examples.

In operating environment 100, in order to successfully wirelessly communicate with another device in wireless network 103, wireless communication device 102 may need to notify the device of the communication bandwidth, the transmission channel(s), and the primary channel that wireless communication device 102 has selected/determined for the wireless communication. In order to do so, wireless communication device 102 may transmit information identifying these parameters, in accordance with a notification mechanism defined by a wireless communication protocol implemented in wireless network 103. In order to optimize wireless communication performance within wireless network 103, it may be desirable that the notification mechanism be designed such that the overhead associated with such notification be relatively low.

Disclosed herein are parameter encoding techniques that may be implemented in various embodiments in order to enable devices such as wireless communication device 102 to notify other devices of the communication bandwidths, transmission channels, and primary channels to be used for wireless communications, in a manner involving relatively little overhead. According to some such techniques, a wireless communication network such as wireless communication network 103 may implement a wireless communication protocol that defines a notification mechanism according to which a wireless communication device such as wireless communication device 102 may use a single index value to specify a plurality of wireless communication parameter values. In various embodiments, the plurality of wireless communication parameter values that correspond to the index value may be specified by a defined mapping scheme. In some embodiments, the wireless communication device may convey the index value by including it in a field of a PHY header or frame. In various embodiments, the wireless communication device may use the index value to specify a communication bandwidth, a transmission channel(s), and a primary channel. In some embodiments, a receiving device may use the index value to identify the plurality of wireless communication parameter values by consulting mapping information specifying mappings of possible index values to sets of parameter values according to the mapping scheme. The embodiments are not limited in this context.

Figure 3:
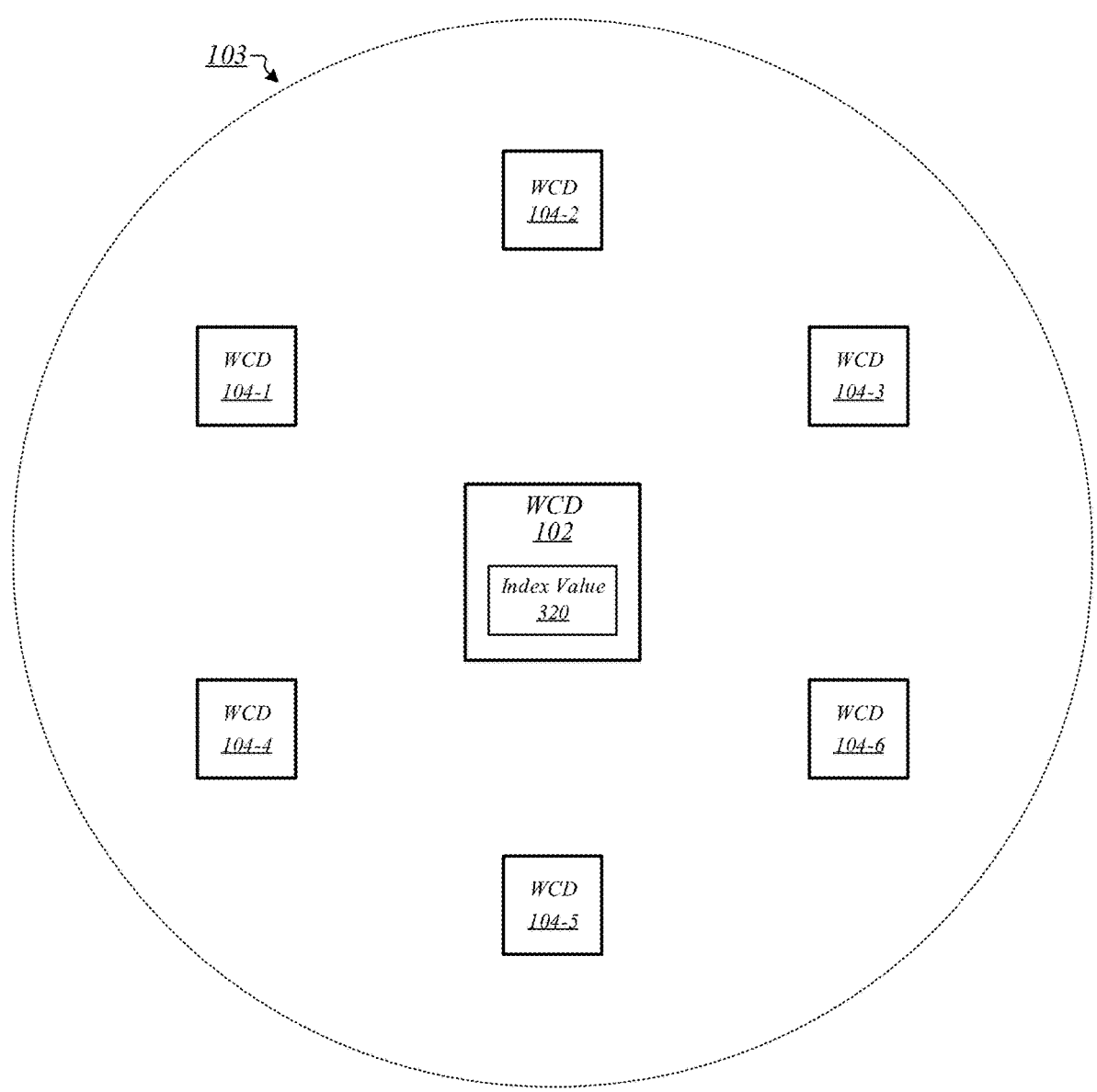
FIG. 3 illustrates an embodiment of a second operating environment.

FIG. 3 illustrates an operating environment 300 that may be representative of one or more of the disclosed parameter encoding techniques according to various embodiments. More particularly, operating environment 300 may be representative of some embodiments in which wireless network 103 implements a wireless communication protocol that utilizes channelization scheme 200 of FIG. 2 and defines a notification mechanism according to which wireless communication device 102 may use a single index value 320 to specify one of multiple possible combinations of communication bandwidth, transmission channel(s), and primary channel according to that channelization scheme. In various embodiments, according to the notification mechanism, the size (in bits) of a field designated for use to convey index values may be selected so as to enable the conveyance of a number of unique values that is at least as large as the number of possible combinations of communication bandwidth, transmission channel(s), and primary channel according to channelization scheme 200 of FIG. 2. The various combinations of communication bandwidth, transmission channel(s), and primary channel that may be usable in wireless network 103 according to channelization scheme 200 of FIG. 2 in some embodiments are illustrated in Table 1 as follows:

TABLE 1

| Communication Bandwidth | Transmission Channel(s) | Primary Channel |
| --- | --- | --- |
| 2.16 GHz | Ch 1 | Ch 1 |
| 2.16 GHz | Ch 2 | Ch 2 |
| 2.16 GHz | Ch 3 | Ch 3 |
| 2.16 GHz | Ch 4 | Ch 4 |
| 4.32 GHz | Ch 9 | Ch 1 |
| 4.32 GHz | Ch 9 | Ch 2 |
| 4.32 GHz | Ch 11 | Ch 3 |
| 4.32 GHz | Ch 11 | Ch 4 |
| 6.48 GHz | Ch 17 | Ch 1 |
| 6.48 GHz | Ch 17 | Ch 2 |

TABLE 1-continued

| Communication Bandwidth | Transmission Channel(s) | Primary Channel |
|---|---|---|
| 6.48 GHz | Ch 17 | Ch 3 |
| 8.64 GHz | Ch 25 | Ch 1 |
| 8.64 GHz | Ch 25 | Ch 2 |
| 8.64 GHz | Ch 25 | Ch 3 |
| 8.64 GHz | Ch 25 | Ch 4 |
| 2.16 GHz + 2.16 GHz | Ch 1 & Ch 2 | Ch 1 |
| 2.16 GHz + 2.16 GHz | Ch 1 & Ch 2 | Ch 2 |
| 2.16 GHz + 2.16 GHz | Ch 1 & Ch 3 | Ch 1 |
| 2.16 GHz + 2.16 GHz | Ch 1 & Ch 3 | Ch 3 |
| 2.16 GHz + 2.16 GHz | Ch 1 & Ch 4 | Ch 1 |
| 2.16 GHz + 2.16 GHz | Ch 1 & Ch 4 | Ch 4 |
| 2.16 GHz + 2.16 GHz | Ch 2 & Ch 3 | Ch 2 |
| 2.16 GHz + 2.16 GHz | Ch 2 & Ch 3 | Ch 3 |
| 2.16 GHz + 2.16 GHz | Ch 2 & Ch 4 | Ch 2 |
| 2.16 GHz + 2.16 GHz | Ch 2 & Ch 4 | Ch 4 |
| 2.16 GHz + 2.16 GHz | Ch 3 & Ch 4 | Ch 3 |
| 2.16 GHz + 2.16 GHz | Ch 3 & Ch 4 | Ch 4 |

As illustrated by Table 1 above, according to channelization scheme 200 of FIG. 2, a total of 27 combinations of communication bandwidth, transmission channel(s), and primary channel may be possible. As such, a five-bit field may be sufficient to accommodate all of the possible combinations of communication bandwidth, transmission channel(s), and primary channel in operating environment 300. However, in some embodiments, the notification mechanism may use a six-bit field to convey index values such as index value 320. The use of six bits may enable the field to be utilized to indicate any of 64 unique index values. Only 27 of those unique values may need to be mapped to combinations of communication bandwidth, transmission channel(s), and primary channel to support the 27 possible combinations of Table 1, and thus 37 unique values may remain available for use in accommodating additional combinations of communication bandwidth, transmission channel(s), and primary channel that may become possible/available in the future.

FIG. 4 illustrates an example of a mapping scheme 400 that may be representative of one or more of the disclosed parameter encoding techniques according to various embodiments. According to mapping scheme 400, possible index values may be mapped to combinations of communication bandwidth, transmission channel(s), and primary channel. Although, multiple indexing solutions may be readily apparent to one of ordinary skill in the art, only one indexing solution is presented herein for simplicity. According to mapping scheme 400, the combinations are listed first by bandwidth, second by transmission channel(s), and third by primary channel. With respect to each bandwidth, an incremental index identifies a particular one of the possible combinations of transmission channel(s) and primary channel for that bandwidth. For each bandwidth other than 2.16 GHz, an offset value is defined, and corresponds to the index value that numerically precedes the lowest index value that maps to that bandwidth. In some embodiments, the offsets for the various bandwidths may be defined such that the entries associated with the different bandwidths do not overlap and there are sufficient entries per bandwidth to accommodate new channels in the future. The embodiments are not limited to the mapping scheme depicted in this example.

Figure 5:
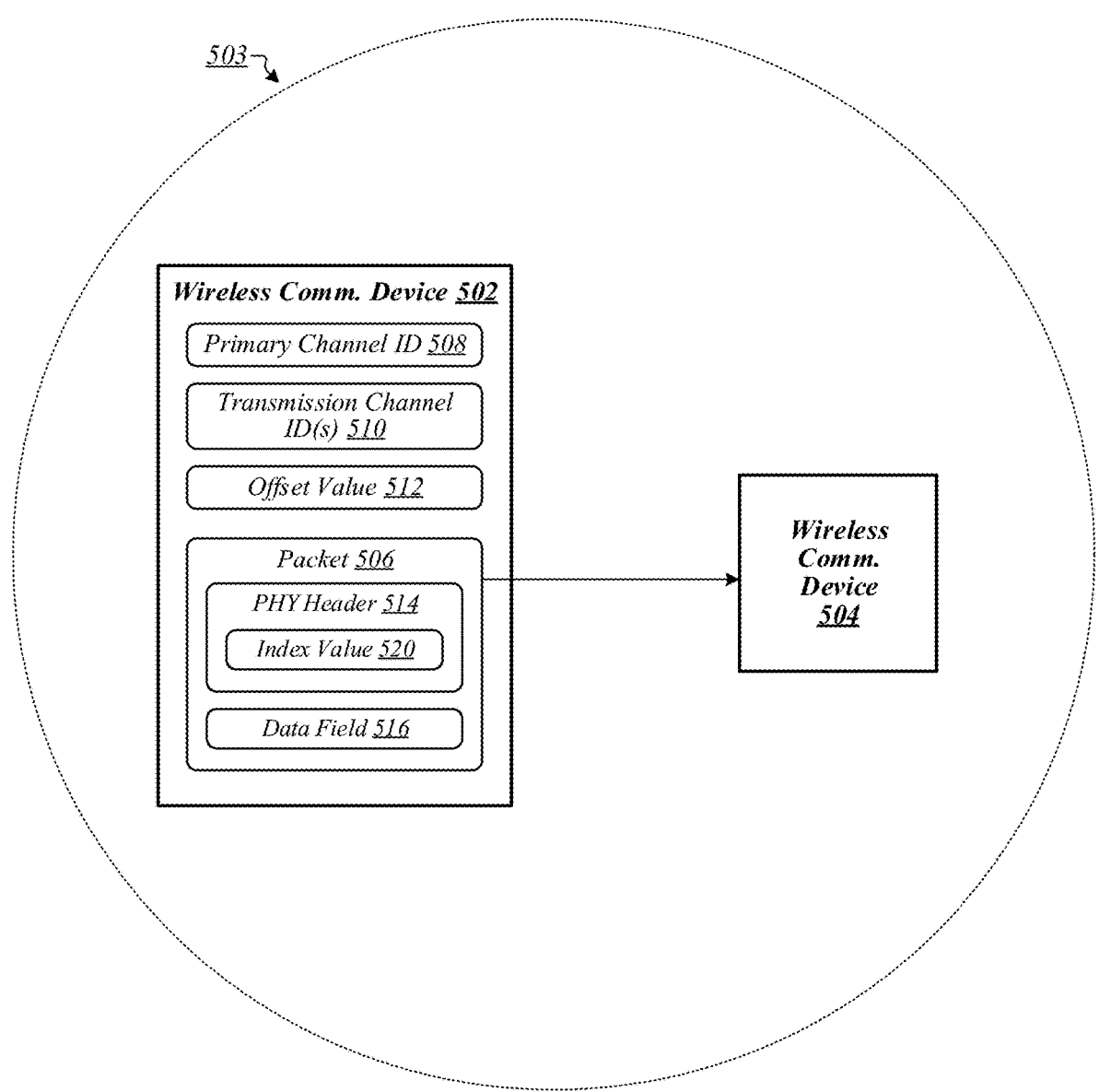
FIG. 5 illustrates an embodiment of a third operating environment.

FIG. 5 illustrates an example of an operating environment 500 that may be representative of an operating environment in which one or more of the disclosed parameter encoding techniques may be implemented according to various embodiments. In operating environment 500, a wireless communication device 502 and a wireless communication device 504 may generally be operative to wirelessly communicate with each other via one or more wireless channels of a wireless network 503. In various embodiments, wireless network 503 may comprise a wireless network that utilizes wireless channel frequencies of the 60 GHz band. In some embodiments, wireless communication devices 502 and 504 may be operative to wirelessly communicate with each other according to one or more standards for 60 GHz wireless communications. In various embodiments, wireless communication devices 502 and 504 may be operative to wirelessly communicate with each other according to one or more protocols and/or procedures defined in IEEE 802.11ad-2012, and/or predecessors, revisions, progeny, and/or variants thereof. In some embodiments, wireless communication devices 502 and 504 may be operative to wirelessly communicate with each other according to one or more protocols and/or procedures defined in one or more standards developed by IEEE 802.11 Task Group ay (TGay). In some embodiments, wireless communication devices 502 and 504 may comprise 60 GHz-capable STAs, such as DMG STAs. In various embodiments, wireless communication device 502 may operate as a PCP/AP, and wireless communication device 504 may operate as a non-PCP/AP STA. In various other embodiments, wireless communication device 504 may operate as a PCP/AP, and wireless communication device 502 may operate as a non-PCP/AP STA. In yet other embodiments, wireless communication devices 502 and 504 may both operate as non-PCP/AP STAs. The embodiments are not limited in this context.

In operating environment 500, wireless communication device 502 may determine to transmit a packet 506 to wireless communication device 504. In various embodiments, in preparation for transmission of the packet 506, wireless communication device 502 may be operative to determine a channel usage configuration that is to be applied for transmission of the packet 506 to wireless communication device 504. In some embodiments, the applicable channel usage configuration for transmission of packet 506 may generally define a manner in which one or more wireless channels of wireless network 503 are to be used in conjunction with the transmission of packet 506.

In various embodiments, the applicable channel usage configuration for transmission of packet 506 may designate a wireless channel that is to comprise a primary channel in the context of the transmission of packet 506. In some embodiments, the wireless channel that is designated as the primary channel may comprise a bandwidth of 2.16 GHz. In an example of such an embodiment, wireless network 503 may implement channelization scheme 200 of FIG. 2, and the applicable channel usage configuration for transmission of packet 506 may designate one of channels 1, 2, 3, and 4 as the primary channel. The embodiments are not limited to this example.

In various embodiments, the applicable channel usage configuration for transmission of packet 506 may designate one or more wireless channels that are to comprise transmission channels in the context of the transmission of packet 506. In some embodiments, each such transmission channel may generally comprise a wireless channel comprising a portion of wireless spectrum that is to be used to convey packet 506.

In various embodiments, the applicable channel usage configuration for transmission of packet 506 may designate a single transmission channel. In some embodiments, the single designated transmission channel may be a wireless channel comprising a 2.16 GHz bandwidth. In an example of such an embodiment, wireless network 503 may implement channelization scheme 200 of FIG. 2, and the applicable channel usage configuration for transmission of packet 506 may designate one of channels 1,2, 3, and 4 as a single transmission channel for the transmission of packet 506. In various embodiments, the applicable channel usage configuration for transmission of packet 506 may designate a same 2.16 GHz bandwidth wireless channel as both the primary channel and a single transmission channel for the purpose of the transmission of packet 506. In an example of such an embodiment, wireless network 503 may implement channelization scheme 200 of FIG. 2, and the applicable channel usage configuration for transmission of packet 506 may designate a same particular one of channels 1, 2, 3, and 4 as both the primary channel and a single transmission channel for the purpose of the transmission of packet 506. The embodiments are not limited to this example.

In some embodiments, the single designated transmission channel may be a wireless channel comprising a 4.32 GHz bandwidth. In an example of such an embodiment, wireless network 503 may implement channelization scheme 200 of FIG. 2, and the applicable channel usage configuration for transmission of packet 506 may designate either channel 9 or channel 11 as a single transmission channel for the transmission of packet 506. In various embodiments, the single designated transmission channel may be a wireless channel comprising a 6.48 GHz bandwidth. In an example of such an embodiment, wireless network 503 may implement channelization scheme 200 of FIG. 2, and the applicable channel usage configuration for transmission of packet 506 may designate channel 17 as a single transmission channel for the transmission of packet 506. In some embodiments, the single designated transmission channel may be a wireless channel comprising a 8.64 GHz bandwidth. In an example of such an embodiment, wireless network 503 may implement channelization scheme 200 of FIG. 2, and the applicable channel usage configuration for transmission of packet 506 may designate channel 25 as a single transmission channel for the transmission of packet 506. The embodiments are not limited to these examples.

In various embodiments, the applicable channel usage configuration for transmission of packet 506 may designate multiple transmission channels. In some embodiments, for example, the applicable channel usage configuration may designate two transmission channels comprising respective portions of wireless spectrum that are both to be used to convey packet 506 according to a dual-channel transmission mode. In various such embodiments, the dual-channel transmission mode may comprise a 2.16 GHz+2.16 GHz mode, and thus the two designated transmission channels may be wireless channels comprising 2.16 GHz bandwidths. As employed herein, the term "dual transmission channels" is employed to denote two transmission channels that are designated for use in conjunction with transmission according to a dual-channel transmission mode. In some embodiments in which wireless network 503 implements channelization scheme 200 of FIG. 2, the applicable channel usage configuration for transmission of packet 506 may designate two of channels 1, 2, 3, and 4 as dual transmission channels for transmission of packet 506 according to a 2.16 GHz+ 2.16 GHz mode. The embodiments are not limited to this example.

In various embodiments, once it has determined the channel usage configuration that is to be applied for transmission of packet 506 to wireless communication device 504, wireless communication device 502 may be operative to identify an index value 520 that corresponds to that channel usage configuration. In some embodiments, wireless communication device 502 may generally be operative to identify index value 520 based on a mapping scheme according to which respective index values are mapped to various possible channel usage configurations. In various embodiments, such a mapping scheme may associate a different respective index value with each of a plurality of possible combinations of designated primary channel and designated transmission channel(s). In an example embodiment, wireless communication device 502 may be operative to identify index value 520 according to mapping scheme 400 of FIG. 4. In some embodiments, in order to enable application of such a mapping scheme, wireless communication device 502 may be operative to determine a primary channel identifier (ID) 508 and transmission channel ID(s) 510. Primary channel ID 508 may comprise a channel ID associated with the primary channel designated by the applicable channel usage configuration. Transmission channel ID(s) 510 may comprise one or more channel IDs, each one of which may comprise a channel ID associated with a respective one of the one or more transmission channels designated by the applicable channel usage configuration.

In various embodiments, wireless communication device 502 may apply a mapping scheme such as mapping scheme 400 of FIG. 4 to identify index value 520 based on primary channel ID 508 and transmission channel ID(s) 510. In some such embodiments, wireless communication device 502 may determine an offset value 512 based on the applicable channel usage configuration, and may identify index value 520 based on primary channel ID 508, transmission channel ID(s) 510, and offset value 512. In various embodiments in which the applicable channel usage configuration designates a single transmission channel, wireless communication device 502 may determine offset value 512 based on a bandwidth of that single transmission channel. In some embodiments in which the applicable channel usage configuration designates dual transmission channels, wireless communication device 502 may determine offset value 512 to comprise a particular offset value associated with the dual-channel transmission mode. The embodiments are not limited in this context.

In various embodiments, packet 506 may comprise a PHY header 514 and a data field 516. In some embodiments, in generating PHY header 514, wireless communication device 502 may set the bits/contents of a field therein to indicate the identified index value 520. In various embodiments, the field that indicates index value 520 may comprise a six-bit field. In some other embodiments, the field that indicates index value 520 may comprise a five-bit field. In yet other embodiments, the field that indicates index value 520 may comprise some other number of bits. The embodiments are not limited in this context.

In various embodiments, wireless communication device 504 may identify the index value 520 comprised in PHY header 514, and may then identify a channel usage configuration that corresponds to that index value 520. In some embodiments, wireless communication device 504 may then apply the identified channel usage configuration for reception of data field 516. In various embodiments, based on index value 520, wireless communication device 504 may determine primary channel ID 508 and transmission channel ID(s) 510. In some embodiments, based on index value 520, wireless communication device 504 may determine whether data field 516 is to be transmitted according to a dual-channel transmission mode, and if so, to determine the channel IDs for the two channels to be used for the dual-channel transmission of data field 516. The embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 6:
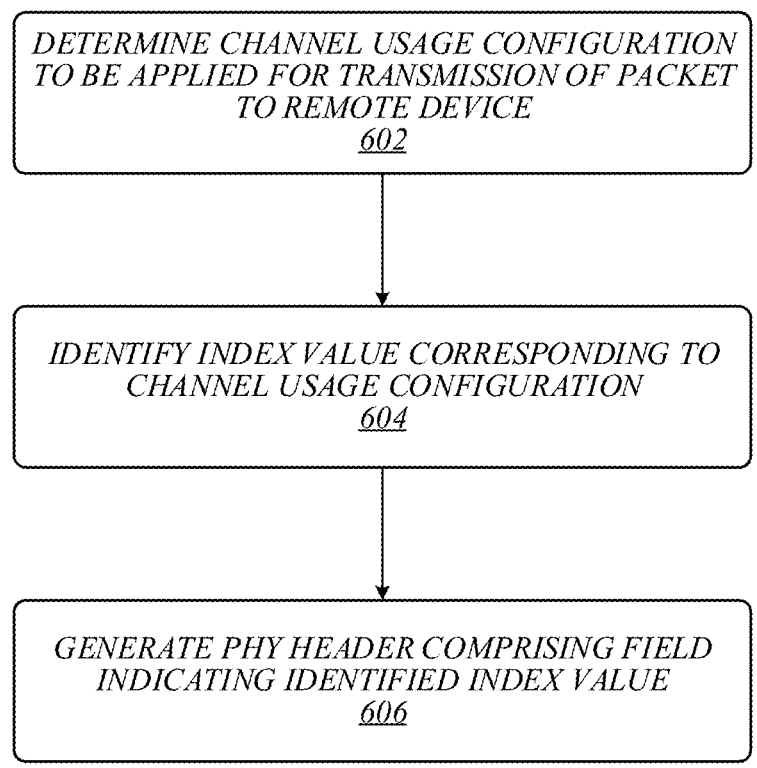
FIG. 6 illustrates an embodiment of a first logic flow.

FIG. 6 illustrates an example of a logic flow 600 that may be representative of operations that may be performed according to one or more of the disclosed parameter encoding techniques in various embodiments. For example, logic flow 600 may be representative of operations that may be performed by wireless communication device 502 in operating environment 500 of FIG. 5 according to some embodiments. As shown in FIG. 6, a channel usage configuration that is to be applied for transmission of a packet to a remote device may be determined at 602. For example, in operating environment 500 of FIG. 5, wireless communication device 502 may determine a channel usage configuration that is to be applied for transmission of packet 506 to wireless communication device 504. At 604, an index value corresponding to the applicable channel usage configuration may be identified. For example, in operating environment 500 of FIG. 5, wireless communication device 502 may identify an index value 520 that corresponds to the channel usage configuration that is to be applied for transmission of packet 506 to wireless communication device 504. At 606, a PHY header may be generated that comprises a field that indicates the index value identified at 604. For example, in operating environment 500 of FIG. 5, wireless communication device 502 may generate PHY header 514, which may comprise a field that indicates index value 520. The embodiments are not limited to these examples.

Figure 7:
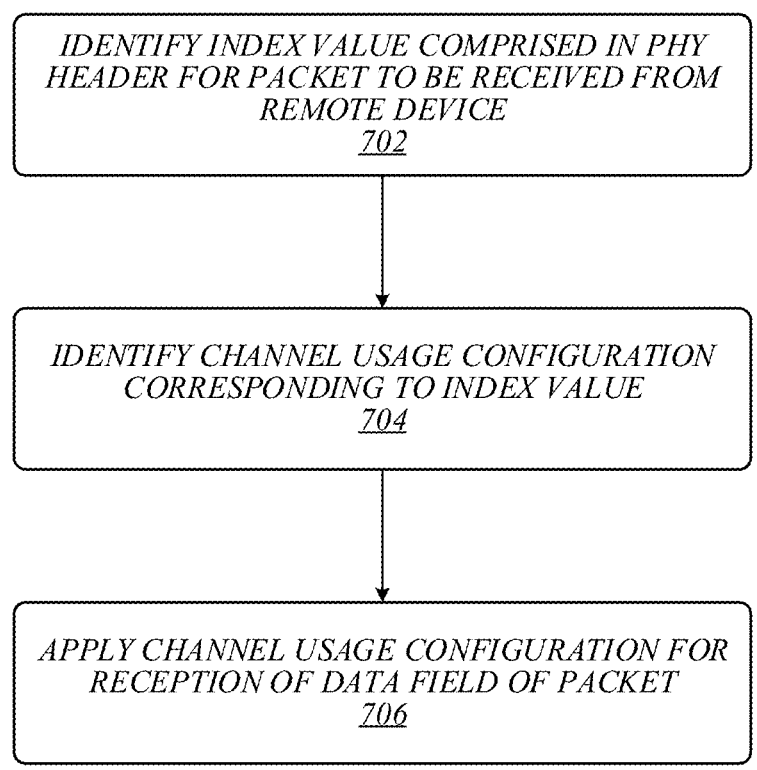
FIG. 7 illustrates an embodiment of a second logic flow.

FIG. 7 illustrates an example of a logic flow 700 that may be representative of operations that may be performed according to one or more of the disclosed parameter encoding techniques in various embodiments. For example, logic flow 700 may be representative of operations that may be performed by wireless communication device 504 in operating environment 500 of FIG. 5 according to some embodiments. As shown in FIG. 7, an index value that is comprised in a PHY header for a packet to be received from a remote device may be identified at 702. For example, in operating environment 500 of FIG. 5, wireless communication device 504 may identify an index value 520 that is comprised in a PHY header 514 for packet 506. At 704, a channel usage configuration that corresponds to the index value may be identified. For example, in operating environment 500 of FIG. 5, wireless communication device 504 may identify a channel usage configuration that corresponds to an index value 520 comprised in PHY header 514. At 706, the identified channel usage configuration may be applied for reception of a data field of the packet. For example, after identifying a channel usage configuration that corresponds to an index value 520 comprised in PHY header 514 in operating environment 500 of FIG. 5, wireless communication device 504 may apply that channel usage configuration for reception of the data field 516 of packet 506. The embodiments are not limited to these examples.

Various embodiments of the invention may be implemented fully or partially in software and/or firmware. This software and/or firmware may take the form of instructions contained in or on a computer-readable storage medium, which may comprise a non-transitory storage medium according to some embodiments. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may generally comprise any medium suitable for storing information in a form readable by one or more computers, such as but not limited to read only memory (ROM); random access memory (RAM); magnetic disk storage media; optical storage media; a flash memory, etc. The embodiments are not limited in this context.

Figure 8A:
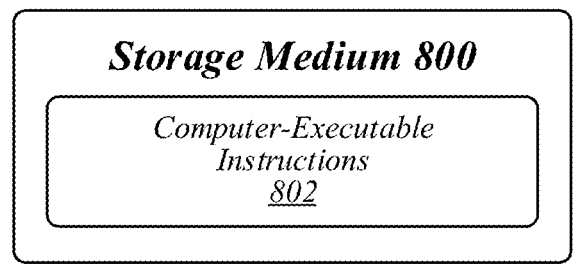
FIG. 8A illustrates an embodiment of a first storage medium.

FIG. 8A illustrates an embodiment of a storage medium 800. Storage medium 800 may comprise any computer-readable storage medium or machine-readable storage medium, such as an optical, magnetic or semiconductor storage medium. In various embodiments, storage medium 800 may comprise an article of manufacture. In some embodiments, storage medium 800 may comprise a non-transitory storage medium. In some embodiments, storage medium 800 may store computer-executable instructions 802 that generally comprise instructions for implementing one or more of the disclosed parameter encoding techniques. In various embodiments, computer-executable instructions 802 may include instructions for implementing one or both of wireless communication device 102 and wireless communication device 502. In some embodiments, computer-executable instructions 802 may include instructions for implementing any of wireless communication devices 104-1 to 104-6 and/or wireless communication device 504. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 8B:
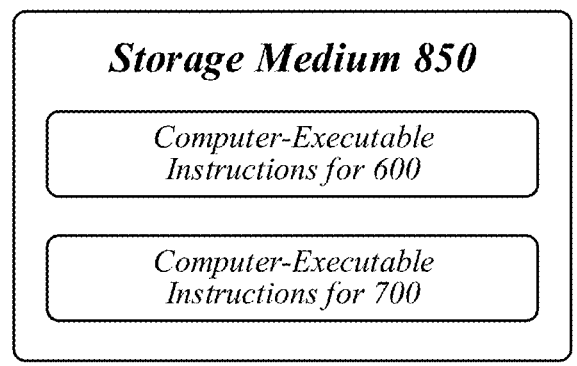
FIG. 8B illustrates an embodiment of a second storage medium.

FIG. 8B illustrates an embodiment of a storage medium 850. Storage medium 850 may comprise any computer-readable storage medium or machine-readable storage medium, such as an optical, magnetic or semiconductor storage medium. In various embodiments, storage medium 850 may comprise an article of manufacture. In some embodiments, storage medium 850 may comprise a non-transitory storage medium. In some embodiments, storage medium 800 may store computer-executable instructions, such as computer-executable instructions to implement one or both of logic flows 600 and 700. Examples of a computer-readable storage medium or machine-readable storage medium and of computer-executable instructions may include any of the respective examples discussed above in reference to storage medium 800 of FIG. 8A. The embodiments are not limited in this context.

Figure 9:
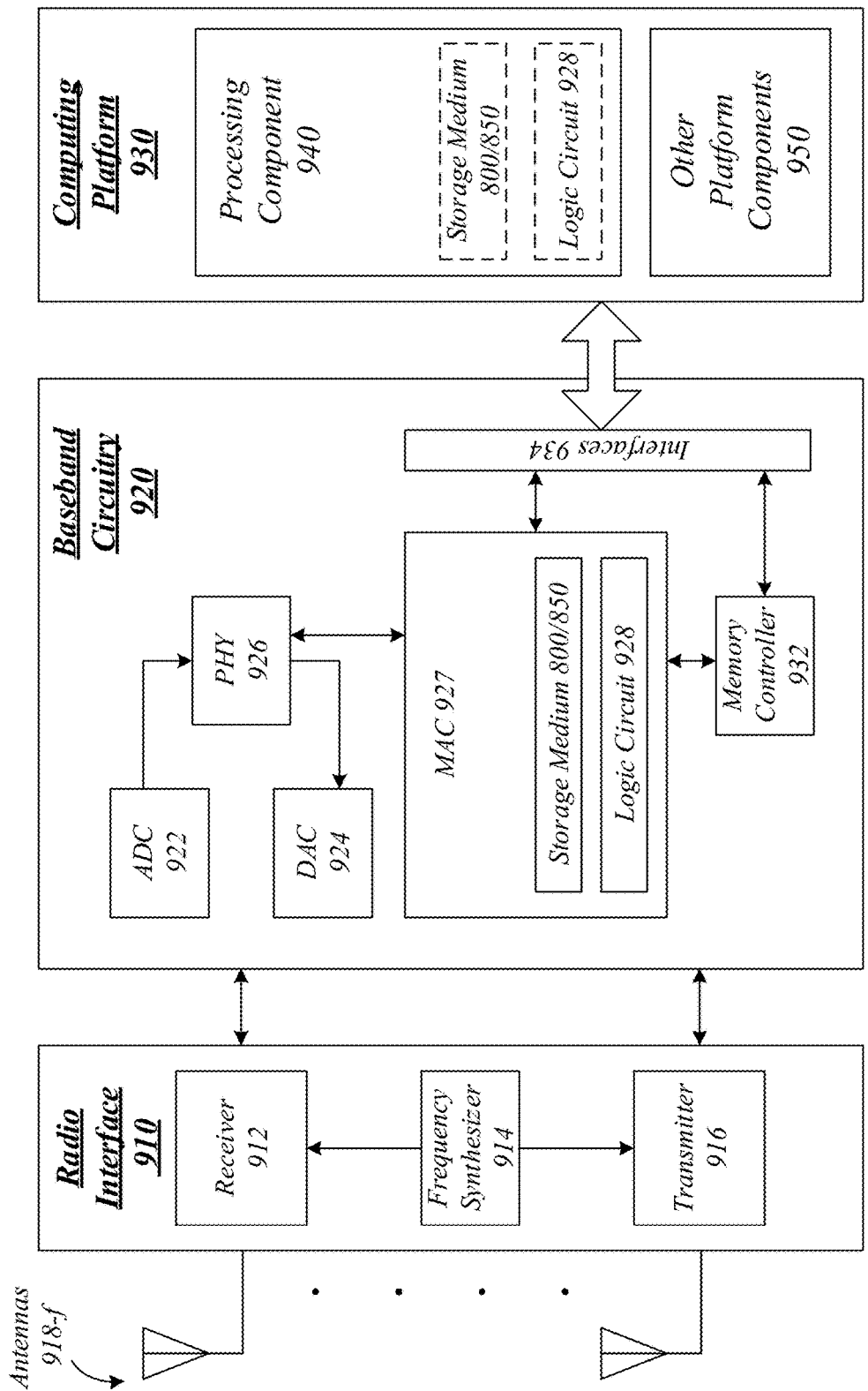
FIG. 9 illustrates an embodiment of a device.

FIG. 9 illustrates an embodiment of a communications device 900 that may implement one or more of wireless communication device 102, wireless communication devices 104-1 to 104-6, wireless communication device 502, wireless communication device 504, logic flow 600, logic flow 700, storage medium 800, and storage medium 850 according to various embodiments. In various embodiments, device 900 may comprise a logic circuit 928. The logic circuit 928 may include physical circuits to perform operations described for one or more of wireless communication device 102, wireless communication devices 104-1 to 104-6, wireless communication device 502, wireless communication device 504, logic flow 600, and logic flow 700, for example. As shown in FIG. 9, device 900 may include a radio interface 910, baseband circuitry 920, and computing platform 930, although the embodiments are not limited to this configuration.

The device 900 may implement some or all of the structure and/or operations for one or more of wireless communication device 102, wireless communication devices 104-1 to 104-6, wireless communication device 502, wireless communication device 504, logic flow 600, logic flow 700, storage medium 800, storage medium 850, and logic circuit 928 in a single computing entity, such as entirely within a single device. Alternatively, the device 900 may distribute portions of the structure and/or operations for one or more of wireless communication device 102, wireless communication devices 104-1 to 104-6, wireless communication device 502, wireless communication device 504, logic flow 600, logic flow 700, storage medium 800, storage medium 850, and logic circuit 928 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 910 may include a component or combination of components adapted for transmitting and/or receiving single-carrier or multi-carrier modulated signals (e.g., including complementary code keying (CCK), orthogonal frequency division multiplexing (OFDM), and/or single-carrier frequency division multiple access (SC-FDMA) symbols) although the embodiments are not limited to any specific over-the-air interface or modulation scheme. Radio interface 910 may include, for example, a receiver 912, a frequency synthesizer 914, and/or a transmitter 916. Radio interface 910 may include bias controls, a crystal oscillator and/or one or more antennas 918-$f$. In another embodiment, radio interface 910 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 920 may communicate with radio interface 910 to process receive and/or transmit signals and may include, for example, an analog-to-digital converter 922 for down converting received signals, a digital-to-analog converter 924 for up converting signals for transmission. Further, baseband circuitry 920 may include a baseband or physical layer (PHY) processing circuit 926 for PHY link layer processing of respective receive/transmit signals. Baseband circuitry 920 may include, for example, a medium access control (MAC) processing circuit 927 for MAC/data link layer processing. Baseband circuitry 920 may include a memory controller 932 for communicating with MAC processing circuit 927 and/or a computing platform 930, for example, via one or more interfaces 934.

In some embodiments, PHY processing circuit 926 may include a frame construction and/or detection module, in combination with additional circuitry such as a buffer memory, to construct and/or deconstruct communication frames. Alternatively or in addition, MAC processing circuit 927 may share processing for certain of these functions or perform these processes independent of PHY processing circuit 926. In some embodiments, MAC and PHY processing may be integrated into a single circuit.

The computing platform 930 may provide computing functionality for the device 900. As shown, the computing platform 930 may include a processing component 940. In addition to, or alternatively of, the baseband circuitry 920, the device 900 may execute processing operations or logic for one or more of wireless communication device 102, wireless communication devices 104-1 to 104-6, wireless communication device 502, wireless communication device 504, logic flow 600, logic flow 700, storage medium 800, storage medium 850, and logic circuit 928 using the processing component 940. The processing component 940 (and/or PHY 926 and/or MAC 927) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 930 may further include other platform components 950. Other platform components 950 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 900 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, display, television, digital television, set top box, wireless access point, base station, node B, subscriber station, mobile subscriber center, radio network controller, router, hub, gateway, bridge, switch, machine, or combination thereof. Accordingly, functions and/or specific configurations of device 900 described herein, may be included or omitted in various embodiments of device 900, as suitably desired.

Embodiments of device 900 may be implemented using single input single output (SISO) architectures. However, certain implementations may include multiple antennas (e.g., antennas 918-f) for transmission and/or reception using adaptive antenna techniques for beamforming or spatial division multiple access (SDMA) and/or using MIMO communication techniques.

The components and features of device 900 may be implemented using any combination of discrete circuitry, application specific integrated circuits (ASICs), logic gates and/or single chip architectures. Further, the features of device 900 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 900 shown in the block diagram of FIG. 9 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Figure 10:
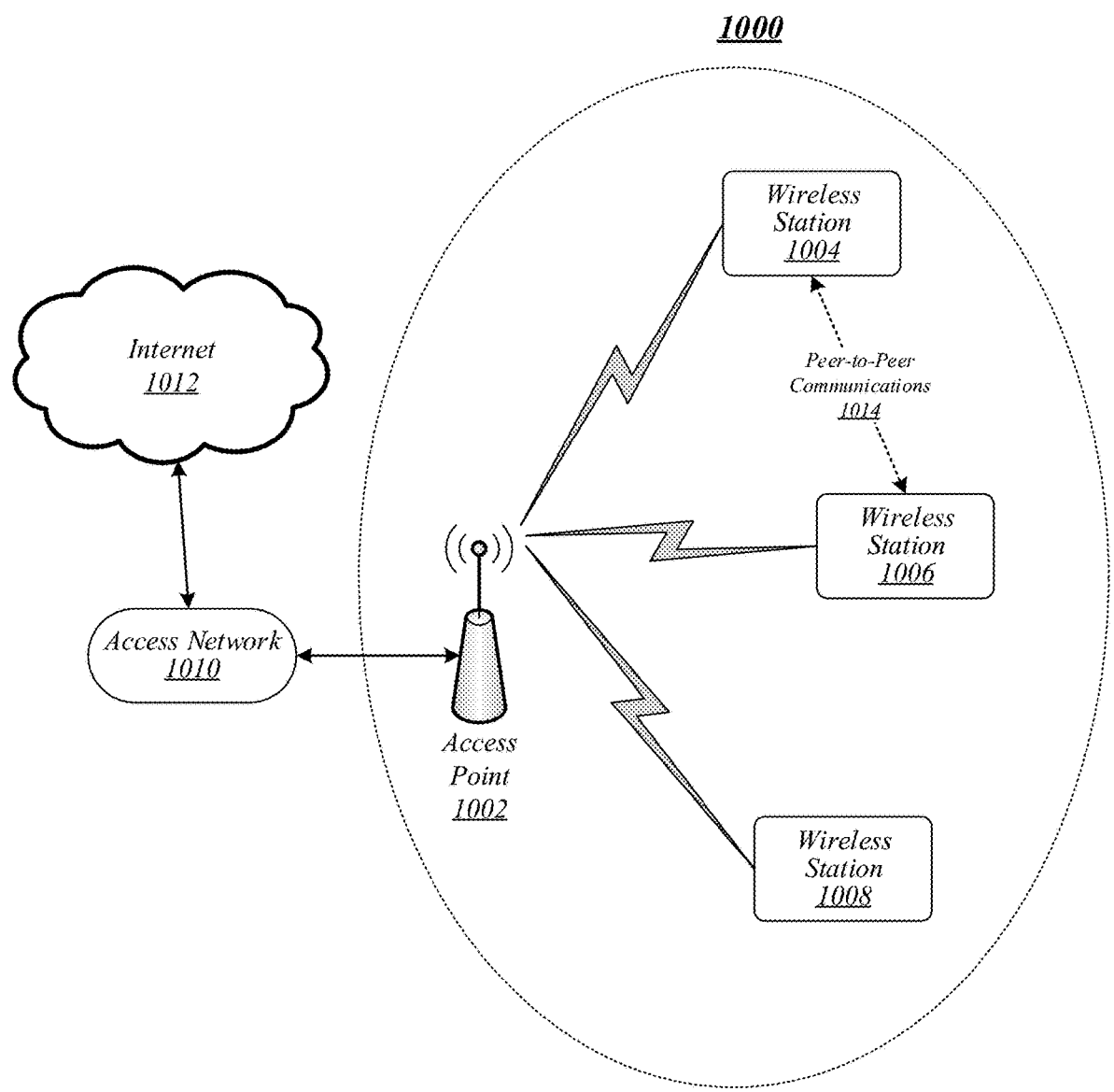
FIG. 10 illustrates an embodiment of a wireless network.

FIG. 10 illustrates an embodiment of a wireless network 1000. As shown in FIG. 10, wireless network comprises an access point 1002 and wireless stations 1004, 1006, and 1008. In various embodiments, wireless network 1000 may comprise a wireless local area network (WLAN), such as a WLAN implementing one or more Institute of Electrical and Electronics Engineers (IEEE) 802.11/15 standards (sometimes collectively referred to as "Wi-Fi"). In some other embodiments, wireless network 1000 may comprise another type of wireless network, and/or may implement other wireless communications standards. In various embodiments, for example, wireless network 1000 may comprise a WWAN or WPAN rather than a WLAN. The embodiments are not limited to this example.

In some embodiments, wireless network 1000 may implement one or more broadband wireless communications standards, such as 3G or 4G standards, including their revisions, progeny, and variants. Examples of 3G or 4G wireless standards may include without limitation any of the IEEE 802.16m and 802.16p standards, 3rd Generation Partnership Project (3GPP) Long Term Evolution (LTE) and LTE-Advanced (LTE-A) standards, and International Mobile Telecommunications Advanced (IMT-ADV) standards, including their revisions, progeny and variants. Other suitable examples may include, without limitation, Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1×RTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3GPP Rel. 8-12 of LTE/System Architecture Evolution (SAE), and so forth. The embodiments are not limited in this context.

In various embodiments, wireless stations 1004, 1006, and 1008 may communicate with access point 1002 in order to obtain connectivity to one or more external data networks. In some embodiments, for example, wireless stations 1004, 1006, and 1008 may connect to the Internet 1012 via access point 1002 and access network 1010. In various embodiments, access network 1010 may comprise a private network that provides subscription-based Internet-connectivity, such as an Internet Service Provider (ISP) network. The embodiments are not limited to this example.

In various embodiments, two or more of wireless stations 1004, 1006, and 1008 may communicate with each other directly by exchanging peer-to-peer communications. For example, in the example of FIG. 10, wireless stations 1004 and 1006 communicate with each other directly by exchanging peer-to-peer communications 1014. In some embodiments, such peer-to-peer communications may be performed according to one or more Wi-Fi Alliance (WFA) standards. For example, in various embodiments, such peer-to-peer communications may be performed according to the WFA Wi-Fi Direct standard, 2010 Release. In various embodiments, such peer-to-peer communications may additionally or alternatively be performed using one or more interfaces, protocols, and/or standards developed by the WFA Wi-Fi Direct Services (WFDS) Task Group. The embodiments are not limited to these examples.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments:

Example 1 is an apparatus, comprising a memory, and logic for a wireless communication device, at least a portion of the logic comprised in circuitry coupled to the memory, the logic to determine a channel usage configuration to be applied for a transmission of a packet to a remote device, the channel usage configuration to designate one or more transmission channels and a primary channel, identify an index value corresponding to the channel usage configuration, and generate a PHY header for the packet, the PHY header to comprise a field containing the identified index value.

Example 2 is the apparatus of Example 1, the logic to determine a channel identifier (ID) associated with the primary channel, and identify the index value based at least in part on the channel ID associated with the primary channel.

Example 3 is the apparatus of any of Examples 1 to 2, the primary channel to comprise a bandwidth of 2.16 GHz.

Example 4 is the apparatus of any of Examples 1 to 3, the channel usage configuration to designate a single transmission channel.

Example 5 is the apparatus of Example 4, the logic to determine a bandwidth of the single transmission channel, and identify the index value based at least in part on the bandwidth of the single transmission channel.

Example 6 is the apparatus of Example 5, the logic to determine an offset value based on the bandwidth of the single transmission channel, and identify the index value based at least in part on the offset value.

Example 7 is the apparatus of any of Examples 4 to 6, the logic to determine a channel identifier (ID) associated with the single transmission channel, and identify the index value based at least in part on the channel ID associated with the single transmission channel.

Example 8 is the apparatus of Example 4, the logic to determine a bandwidth of the single transmission channel, determine an offset value based on the bandwidth of the single transmission channel, determine a channel identifier (ID) associated with the single transmission channel, and identify the index value based at least in part on the offset value and the channel ID associated with the single transmission channel.

Example 9 is the apparatus of Example 8, the logic to identify the index value based at least in part on the offset value, the channel ID associated with the single transmission channel, and a channel ID associated with the primary channel.

Example 10 is the apparatus of any of Examples 4 to 9, the single transmission channel to comprise a bandwidth of 2.16 GHz.

Example 11 is the apparatus of Example 10, a channel identifier (ID) associated with the single transmission channel to match a channel ID associated with the primary channel.

Example 12 is the apparatus of any of Examples 4 to 9, the single transmission channel to comprise a bandwidth of 4.32 GHz.

Example 13 is the apparatus of any of Examples 4 to 9, the single transmission channel to comprise a bandwidth of 6.48 GHz.

Example 14 is the apparatus of any of Examples 4 to 9, the single transmission channel to comprise a bandwidth of 8.64 GHz.

Example 15 is the apparatus of any of Examples 1 to 3, the channel usage configuration to designate two transmission channels.

Example 16 is the apparatus of Example 15, the logic to determine an offset value associated with a dual-channel transmission mode, and identify the index value based at least in part on the offset value.

Example 17 is the apparatus of any of Examples 15 to 16, the logic to determine respective associated channel identifiers (IDs) of the two transmission channels, and identify the index value based at least in part on the respective associated channel IDs of the two transmission channels.

Example 18 is the apparatus of any of Examples 15 to 17, the logic to determine an offset value associated with a dual-channel transmission mode, determine respective associated channel identifiers (IDs) of the two transmission channels, and identify the index value based at least in part on the offset value and the respective associated channel IDs of the two transmission channels.

Example 19 is the apparatus of Example 18, the logic to identify the index value based at least in part on the offset value, the respective associated channel IDs of the two transmission channels, and a channel ID associated with the primary channel.

Example 20 is the apparatus of any of Examples 15 to 19, the two transmission channels to comprise bandwidths of 2.16 GHz.

Example 21 is the apparatus of any of Examples 1 to 20, the field to comprise a six-bit field.

Example 22 is the apparatus of any of Examples 1 to 20, the field to comprise a five-bit field.

Example 23 is a system, comprising an apparatus according to any of Examples 1 to 22, and at least one radio frequency (RF) transceiver.

Example 24 is the system of Example 23, comprising at least one processor.

Example 25 is the system of any of Examples 23 to 24, comprising at least one RF antenna.

Example 26 is an apparatus, comprising a memory, and logic for a wireless communication device, at least a portion of the logic comprised in circuitry coupled to the memory, the logic to determine a channel usage configuration to be applied for a transmission of a packet to a remote device, the channel usage configuration to designate one or more transmission channels and a primary channel, identify an index value corresponding to the channel usage configuration, and generate a PHY header for the packet, the PHY header to comprise a field indicating the index value.

Example 27 is the apparatus of Example 26, the channel usage configuration to designate a single transmission channel.

Example 28 is the apparatus of Example 27, the logic to determine an offset value based on a bandwidth of the single transmission channel, and identify the index value based on the offset value, a channel identifier (ID) associated with the single transmission channel, and a channel ID associated with the primary channel.

Example 29 is the apparatus of any of Examples 27 to 28, the single transmission channel to comprise a bandwidth of 2.16 GHz, 4.32 GHz, 6.48 GHz, or 8.64 GHz.

Example 30 is the apparatus of Example 26, the channel usage configuration to designate first and second transmission channels to be used to transmit the packet according to a dual-channel transmission mode, the logic to identify the index value based on an offset value associated with the dual-channel transmission mode, a channel identifier (ID) associated with the first transmission channel, a channel ID associated with the second transmission channel, and a channel ID associated with the primary channel.

Example 31 is the apparatus of any of Examples 26 to 30, the field to comprise a six-bit field.

Example 32 is a system, comprising an apparatus according to any of Examples 26 to 31, and at least one radio frequency (RF) transceiver.

Example 33 is the system of Example 32, comprising at least one processor.

Example 34 is the system of any of Examples 32 to 33, comprising at least one RF antenna.

Example 35 is an apparatus, comprising a memory, and logic for a wireless communication device, at least a portion of the logic comprised in circuitry coupled to the memory, the logic to identify an index value comprised in a PHY header for a packet to be received from a remote device, identify a channel usage configuration corresponding to the index value, the channel usage configuration to designate one or more transmission channels and a primary channel, and apply the channel usage configuration for reception of a data field of the packet.

Example 36 is the apparatus of Example 35, the logic to determine a channel identifier (ID) associated with the primary channel based on the index value.

Example 37 is the apparatus of any of Examples 35 to 36, the primary channel to comprise a bandwidth of 2.16 GHz.

Example 38 is the apparatus of any of Examples 35 to 37, the channel usage configuration to designate a single transmission channel.

Example 39 is the apparatus of Example 38, the logic to determine a bandwidth of the single transmission channel based on the index value.

Example 40 is the apparatus of any of Examples 38 to 39, the logic to determine a channel identifier (ID) associated with the single transmission channel based on the index value.

Example 41 is the apparatus of Example 38 to 40, the logic to identify, based on the index value, a channel identifier (ID) associated with the single transmission channel and a channel ID associated with the primary channel.

Example 42 is the apparatus of any of Examples 38 to 41, the single transmission channel to comprise a bandwidth of 2.16 GHz.

Example 43 is the apparatus of Example 42, a channel identifier (ID) associated with the single transmission channel to match a channel ID associated with the primary channel.

Example 44 is the apparatus of any of Examples 38 to 41, the single transmission channel to comprise a bandwidth of 4.32 GHz.

Example 45 is the apparatus of any of Examples 38 to 41, the single transmission channel to comprise a bandwidth of 6.48 GHz.

Example 46 is the apparatus of any of Examples 38 to 41, the single transmission channel to comprise a bandwidth of 8.64 GHz.

Example 47 is the apparatus of any of Examples 35 to 37, the channel usage configuration to designate two transmission channels.

Example 48 is the apparatus of Example 47, the logic to determine respective associated channel identifiers (IDs) of the two transmission channels based on the index value.

Example 49 is the apparatus of Example 48, the logic to determine, based on the index value, the respective associated channel IDs of the two transmission channels and a channel ID associated with the primary channel.

Example 50 is the apparatus of any of Examples 47 to 49, the two transmission channels to comprise bandwidths of 2.16 GHz.

Example 51 is the apparatus of any of Examples 35 to 50, the field to comprise a six-bit field.

Example 52 is the apparatus of any of Examples 35 to 50, the field to comprise a five-bit field.

Example 53 is a system, comprising an apparatus according to any of Examples 35 to 51, and at least one radio frequency (RF) transceiver.

Example 54 is the system of Example 53, comprising at least one processor.

Example 55 is the system of any of Examples 53 to 54, comprising at least one RF antenna.

Example 56 is an apparatus, comprising a memory, and logic for a wireless communication device, at least a portion of the logic comprised in circuitry coupled to the memory, the logic to identify an index value comprised in a PHY header for a packet to be received from a remote device, identify a channel usage configuration corresponding to the index value, the channel usage configuration to designate one or more transmission channels and a primary channel, and apply the channel usage configuration for reception of a data field of the packet via the one or more transmission channels.

Example 57 is the apparatus of Example 56, the channel usage configuration to designate a single transmission channel.

Example 58 is the apparatus of Example 57, the logic to determine, based on the index value a channel identifier (ID) associated with the single transmission channel, and a channel ID associated with the primary channel.

Example 59 is the apparatus of any Examples 57 to 58, the single transmission channel to comprise a bandwidth of 2.16 GHz, 4.32 GHz, 6.48 GHz, or 8.64 GHz.

Example 60 is the apparatus of Example 56, the channel usage configuration to designate dual transmission channels, the logic to determine, based on the index value first and second channel identifiers (IDs) associated with dual transmission channels, and a channel ID associated with the primary channel.

Example 61 is the apparatus of any of Examples 56 to 60, the field to comprise a six-bit field.

Example 62 is a system, comprising an apparatus according to any of Examples 56 to 61, and at least one radio frequency (RF) transceiver.

Example 63 is the system of Example 62, comprising at least one processor.

Example 64 is the system of any of Examples 62 to 63, comprising at least one RF antenna.

Example 65 is at least one non-transitory computer-readable storage medium comprising a set of instructions that, in response to being executed at a wireless communication device, cause the wireless communication device to determine a channel usage configuration to be applied for a transmission of a packet to a remote device, the channel usage configuration to designate one or more transmission channels and a primary channel, identify an index value corresponding to the channel usage configuration, and generate a PHY header for the packet, the PHY header to comprise a field containing the identified index value.

Example 66 is the at least one non-transitory computer-readable storage medium of Example 65, comprising instructions that, in response to being executed at the wireless communication device, cause the wireless communication device to determine a channel identifier (ID) associated with the primary channel, and identify the index value based at least in part on the channel ID associated with the primary channel.

Example 67 is the at least one non-transitory computer-readable storage medium of any of Examples 65 to 66, the primary channel to comprise a bandwidth of 2.16 GHz.

Example 68 is the at least one non-transitory computer-readable storage medium of any of Examples 65 to 67, the channel usage configuration to designate a single transmission channel.

Example 69 is the at least one non-transitory computer-readable storage medium of Example 68, comprising instructions that, in response to being executed at the wireless communication device, cause the wireless communication device to determine a bandwidth of the single transmission channel, and identify the index value based at least in part on the bandwidth of the single transmission channel.

Example 70 is the at least one non-transitory computer-readable storage medium of Example 69, comprising instructions that, in response to being executed at the wireless communication device, cause the wireless communication device to determine an offset value based on the bandwidth of the single transmission channel, and identify the index value based at least in part on the offset value.

Example 71 is the at least one non-transitory computer-readable storage medium of any of Examples 68 to 70, comprising instructions that, in response to being executed at the wireless communication device, cause the wireless communication device to determine a channel identifier (ID) associated with the single transmission channel, and identify the index value based at least in part on the channel ID associated with the single transmission channel.

Example 72 is the at least one non-transitory computer-readable storage medium of any of Examples 68 to 71, comprising instructions that, in response to being executed at the wireless communication device, cause the wireless communication device to determine a bandwidth of the single transmission channel, determine an offset value based on the bandwidth of the single transmission channel, determine a channel identifier (ID) associated with the single transmission channel, and identify the index value based at least in part on the offset value and the channel ID associated with the single transmission channel.

Example 73 is the at least one non-transitory computer-readable storage medium of Example 72, comprising instructions that, in response to being executed at the wireless communication device, cause the wireless communication device to identify the index value based at least in part on the offset value, the channel ID associated with the single transmission channel, and a channel ID associated with the primary channel.

Example 74 is the at least one non-transitory computer-readable storage medium of any of Examples 68 to 73, the single transmission channel to comprise a bandwidth of 2.16 GHz.

Example 75 is the at least one non-transitory computer-readable storage medium of Example 74, a channel identifier (ID) associated with the single transmission channel to match a channel ID associated with the primary channel.

Example 76 is the at least one non-transitory computer-readable storage medium of any of Examples 68 to 73, the single transmission channel to comprise a bandwidth of 4.32 GHz.

Example 77 is the at least one non-transitory computer-readable storage medium of any of Examples 68 to 73, the single transmission channel to comprise a bandwidth of 6.48 GHz.

Example 78 is the at least one non-transitory computer-readable storage medium of any of Examples 68 to 73, the single transmission channel to comprise a bandwidth of 8.64 GHz.

Example 79 is the at least one non-transitory computer-readable storage medium of any of Examples 65 to 67, the channel usage configuration to designate two transmission channels.

Example 80 is the at least one non-transitory computer-readable storage medium of Example 79, comprising instructions that, in response to being executed at the wireless communication device, cause the wireless communication device to determine an offset value associated with a dual-channel transmission mode, and identify the index value based at least in part on the offset value.

Example 81 is the at least one non-transitory computer-readable storage medium of any of Examples 79 to 80, comprising instructions that, in response to being executed at the wireless communication device, cause the wireless communication device to determine respective associated channel identifiers (IDs) of the two transmission channels, and identify the index value based at least in part on the respective associated channel IDs of the two transmission channels.

Example 82 is the at least one non-transitory computer-readable storage medium of Example 81, comprising instructions that, in response to being executed at the wireless communication device, cause the wireless communication device to determine an offset value associated with a dual-channel transmission mode, determine respective associated channel identifiers (IDs) of the two transmission channels, and identify the index value based at least in part on the offset value and the respective associated channel IDs of the two transmission channels.

Example 83 is the at least one non-transitory computer-readable storage medium of Example 82, comprising instructions that, in response to being executed at the wireless communication device, cause the wireless communication device to identify the index value based at least in part on the offset value, the respective associated channel IDs of the two transmission channels, and a channel ID associated with the primary channel.

Example 84 is the at least one non-transitory computer-readable storage medium of any of Examples 79 to 83, the two transmission channels to comprise bandwidths of 2.16 GHz.

Example 85 is the at least one non-transitory computer-readable storage medium of any of Examples 65 to 84, the field to comprise a six-bit field.

Example 86 is the at least one non-transitory computer-readable storage medium of any of Examples 65 to 84, the field to comprise a five-bit field.

Example 87 is at least one non-transitory computer-readable storage medium comprising a set of instructions that, in response to being executed at a wireless communication device, cause the wireless communication device to determine a channel usage configuration to be applied for a transmission of a packet to a remote device, the channel usage configuration to designate one or more transmission channels and a primary channel, identify an index value corresponding to the channel usage configuration, and generate a PHY header for the packet, the PHY header to comprise a field indicating the index value.

Example 88 is the at least one non-transitory computer-readable storage medium of Example 87, the channel usage configuration to designate a single transmission channel.

Example 89 is the at least one non-transitory computer-readable storage medium of Example 88, comprising instructions that, in response to being executed at the wireless communication device, cause the wireless communication device to determine an offset value based on a bandwidth of the single transmission channel, and identify the index value based on the offset value, a channel identifier (ID) associated with the single transmission channel, and a channel ID associated with the primary channel.

Example 90 is the at least one non-transitory computer-readable storage medium of any of Examples 88 to 89, the single transmission channel to comprise a bandwidth of 2.16 GHz, 4.32 GHz, 6.48 GHz, or 8.64 GHz.

Example 91 is the at least one non-transitory computer-readable storage medium of Example 87, comprising instructions that, in response to being executed at the wireless communication device, cause the wireless communication device to identify the index value based on an offset value associated with a dual-channel transmission mode according to which first and second transmission channels are to be used to transmit the packet, a channel identifier (ID) associated with the first transmission channel, a channel ID associated with the second transmission channel, and a channel ID associated with the primary channel.

Example 92 is the at least one non-transitory computer-readable storage medium of any of Examples 87 to 91, the field to comprise a six-bit field.

Example 93 is at least one non-transitory computer-readable storage medium comprising a set of instructions that, in response to being executed at a wireless communication device, cause the wireless communication device to identify an index value comprised in a PHY header for a packet to be received from a remote device, identify a channel usage configuration corresponding to the index value, the channel usage configuration to designate one or more transmission channels and a primary channel, and apply the channel usage configuration for reception of a data field of the packet.

Example 94 is the at least one non-transitory computer-readable storage medium of Example 93, comprising instructions that, in response to being executed at the wireless communication device, cause the wireless communication device to determine a channel identifier (ID) associated with the primary channel based on the index value.

Example 95 is the at least one non-transitory computer-readable storage medium of any of Examples 93 to 94, the primary channel to comprise a bandwidth of 2.16 GHz.

Example 96 is the at least one non-transitory computer-readable storage medium of any of Examples 93 to 95, the channel usage configuration to designate a single transmission channel.

Example 97 is the at least one non-transitory computer-readable storage medium of Example 96, comprising instructions that, in response to being executed at the wireless communication device, cause the wireless communication device to determine a bandwidth of the single transmission channel based on the index value.

Example 98 is the at least one non-transitory computer-readable storage medium of any of Examples 96 to 97, comprising instructions that, in response to being executed at the wireless communication device, cause the wireless communication device to determine a channel identifier (ID) associated with the single transmission channel based on the index value.

Example 99 is the at least one non-transitory computer-readable storage medium of Example 96 to 98, comprising instructions that, in response to being executed at the wireless communication device, cause the wireless communication device to identify, based on the index value, a channel identifier (ID) associated with the single transmission channel and a channel ID associated with the primary channel.

Example 100 is the at least one non-transitory computer-readable storage medium of any of Examples 96 to 99, the single transmission channel to comprise a bandwidth of 2.16 GHz.

Example 101 is the at least one non-transitory computer-readable storage medium of Example 100, a channel identifier (ID) associated with the single transmission channel to match a channel ID associated with the primary channel.

Example 102 is the at least one non-transitory computer-readable storage medium of any of Examples 96 to 99, the single transmission channel to comprise a bandwidth of 4.32 GHz.

Example 103 is the at least one non-transitory computer-readable storage medium of any of Examples 96 to 99, the single transmission channel to comprise a bandwidth of 6.48 GHz.

Example 104 is the at least one non-transitory computer-readable storage medium of any of Examples 96 to 99, the single transmission channel to comprise a bandwidth of 8.64 GHz.

Example 105 is the at least one non-transitory computer-readable storage medium of any of Examples 93 to 95, the channel usage configuration to designate two transmission channels.

Example 106 is the at least one non-transitory computer-readable storage medium of Example 105, comprising instructions that, in response to being executed at the wireless communication device, cause the wireless communication device to determine respective associated channel identifiers (IDs) of the two transmission channels based on the index value.

Example 107 is the at least one non-transitory computer-readable storage medium of Example 106, comprising instructions that, in response to being executed at the wireless communication device, cause the wireless communication device to determine, based on the index value, the respective associated channel IDs of the two transmission channels and a channel ID associated with the primary channel.

Example 108 is the at least one non-transitory computer-readable storage medium of any of Examples 105 to 107, the two transmission channels to comprise bandwidths of 2.16 GHz.

Example 109 is the at least one non-transitory computer-readable storage medium of any of Examples 93 to 108, the field to comprise a six-bit field.

Example 110 is the at least one non-transitory computer-readable storage medium of any of Examples 93 to 108, the field to comprise a five-bit field.

Example 111 is at least one non-transitory computer-readable storage medium comprising a set of instructions that, in response to being executed at a wireless communication device, cause the wireless communication device to identify an index value comprised in a PHY header for a packet to be received from a remote device, identify a channel usage configuration corresponding to the index value, the channel usage configuration to designate one or more transmission channels and a primary channel, and apply the channel usage configuration for reception of a data field of the packet via the one or more transmission channels.

Example 112 is the at least one non-transitory computer-readable storage medium of Example 111, the channel usage configuration to designate a single transmission channel.

Example 113 is the at least one non-transitory computer-readable storage medium of Example 112, comprising instructions that, in response to being executed at the wireless communication device, cause the wireless communication device to determine, based on the index value a channel identifier (ID) associated with the single transmission channel, and a channel ID associated with the primary channel.

Example 114 is the at least one non-transitory computer-readable storage medium of any Examples 112 to 113, the single transmission channel to comprise a bandwidth of 2.16 GHz, 4.32 GHz, 6.48 GHz, or 8.64 GHz.

Example 115 is the at least one non-transitory computer-readable storage medium of Example 111, comprising instructions that, in response to being executed at the wireless communication device, cause the wireless communication device to determine, based on the index value first and second channel identifiers (IDs) associated with dual transmission channels designated by the channel usage configuration, and a channel ID associated with the primary channel.

Example 116 is the at least one non-transitory computer-readable storage medium of any of Examples 111 to 115, the field to comprise a six-bit field.

Example 117 is a method, comprising determining, at a wireless communication device, a channel usage configuration to be applied for a transmission of a packet to a remote device, the channel usage configuration to designate one or more transmission channels and a primary channel, identifying an index value corresponding to the channel usage configuration, and generating a PHY header for the packet, the PHY header to comprise a field containing the identified index value.

Example 118 is the method of Example 117, comprising determining a channel identifier (ID) associated with the primary channel, and identifying the index value based at least in part on the channel ID associated with the primary channel.

Example 119 is the method of any of Examples 117 to 118, the primary channel to comprise a bandwidth of 2.16 GHz.

Example 120 is the method of any of Examples 117 to 119, the channel usage configuration to designate a single transmission channel.

Example 121 is the method of Example 120, comprising determining a bandwidth of the single transmission channel, and identifying the index value based at least in part on the bandwidth of the single transmission channel.

Example 122 is the method of Example 121, comprising determining an offset value based on the bandwidth of the single transmission channel, and identifying the index value based at least in part on the offset value.

Example 123 is the method of any of Examples 120 to 122, comprising determining a channel identifier (ID) associated with the single transmission channel, and identifying the index value based at least in part on the channel ID associated with the single transmission channel.

Example 124 is the method of any of Examples 120 to 123, comprising determining a bandwidth of the single transmission channel, determining an offset value based on the bandwidth of the single transmission channel, determining a channel identifier (ID) associated with the single transmission channel, and identifying the index value based at least in part on the offset value and the channel ID associated with the single transmission channel.

Example 125 is the method of Example 124, comprising identifying the index value based at least in part on the offset value, the channel ID associated with the single transmission channel, and a channel ID associated with the primary channel.

Example 126 is the method of any of Examples 120 to 125, the single transmission channel to comprise a bandwidth of 2.16 GHz.

Example 127 is the method of Example 126, a channel identifier (ID) associated with the single transmission channel to match a channel ID associated with the primary channel.

Example 128 is the method of any of Examples 120 to 125, the single transmission channel to comprise a bandwidth of 4.32 GHz.

Example 129 is the method of any of Examples 120 to 125, the single transmission channel to comprise a bandwidth of 6.48 GHz.

Example 130 is the method of any of Examples 120 to 125, the single transmission channel to comprise a bandwidth of 8.64 GHz.

Example 131 is the method of any of Examples 117 to 119, the channel usage configuration to designate two transmission channels.

Example 132 is the method of Example 131, comprising determining an offset value associated with a dual-channel transmission mode, and identifying the index value based at least in part on the offset value.

Example 133 is the method of any of Examples 131 to 132, comprising determining respective associated channel identifiers (IDs) of the two transmission channels, and identifying the index value based at least in part on the respective associated channel IDs of the two transmission channels.

Example 134 is the method of Example 133, comprising determining an offset value associated with a dual-channel transmission mode, determining respective associated channel identifiers (IDs) of the two transmission channels, and identifying the index value based at least in part on the offset value and the respective associated channel IDs of the two transmission channels.

Example 135 is the method of Example 134, comprising identifying the index value based at least in part on the offset value, the respective associated channel IDs of the two transmission channels, and a channel ID associated with the primary channel.

Example 136 is the method of any of Examples 131 to 135, the two transmission channels to comprise bandwidths of 2.16 GHz.

Example 137 is the method of any of Examples 117 to 136, the field to comprise a six-bit field.

Example 138 is the method of any of Examples 117 to 136, the field to comprise a five-bit field.

Example 139 is at least one non-transitory computer-readable storage medium comprising a set of instructions that, in response to being executed on a computing device, cause the computing device to perform a method according to any of Examples 117 to 138.

Example 140 is an apparatus, comprising means for performing a method according to any of Examples 117 to 138.

Example 141 is a system, comprising the apparatus of Example 140, and at least one radio frequency (RF) transceiver.

Example 142 is the system of Example 141, comprising at least one processor.

Example 143 is the system of any of Examples 142 to 143, comprising at least one RF antenna.

Example 144 is a method, comprising determining, at a wireless communication device, a channel usage configuration to be applied for a transmission of a packet to a remote device, the channel usage configuration to designate one or more transmission channels and a primary channel, identifying an index value corresponding to the channel usage configuration, and generating a PHY header for the packet, the PHY header to comprise a field indicating the index value.

Example 145 is the method of Example 144, the channel usage configuration to designate a single transmission channel.

Example 146 is the method of Example 145, comprising determining an offset value based on a bandwidth of the single transmission channel, and identifying the index value based on the offset value, a channel identifier (ID) associated with the single transmission channel, and a channel ID associated with the primary channel.

Example 147 is the method of any of Examples 144 to 146, the single transmission channel to comprise a bandwidth of 2.16 GHz, 4.32 GHz, 6.48 GHz, or 8.64 GHz.

Example 148 is the method of Example 144, comprising identifying the index value based on an offset value associated with a dual-channel transmission mode according to which first and second transmission channels are to be used to transmit the packet, a channel identifier (ID) associated with the first transmission channel, a channel ID associated with the second transmission channel, and a channel ID associated with the primary channel.

Example 149 is the method of any of Examples 144 to 148, the field to comprise a six-bit field.

Example 150 is at least one non-transitory computer-readable storage medium comprising a set of instructions that, in response to being executed on a computing device, cause the computing device to perform a method according to any of Examples 144 to 149.

Example 151 is an apparatus, comprising means for performing a method according to any of Examples 144 to 149.

Example 152 is a system, comprising the apparatus of Example 151, and at least one radio frequency (RF) transceiver.

Example 153 is the system of Example 152, comprising at least one processor.

Example 154 is the system of any of Examples 152 to 153, comprising at least one RF antenna.

Example 155 is a method, comprising identifying, at a wireless communication device, an index value comprised in a PHY header for a packet to be received from a remote device, identifying a channel usage configuration corresponding to the index value, the channel usage configuration to designate one or more transmission channels and a primary channel, and applying the channel usage configuration for reception of a data field of the packet.

Example 156 is the method of Example 155, comprising determining a channel identifier (ID) associated with the primary channel based on the index value.

Example 157 is the method of any of Examples 155 to 156, the primary channel to comprise a bandwidth of 2.16 GHz.

Example 158 is the method of any of Examples 155 to 157, the channel usage configuration to designate a single transmission channel.

Example 159 is the method of Example 158, comprising determining a bandwidth of the single transmission channel based on the index value.

Example 160 is the method of any of Examples 158 to 159, comprising determining a channel identifier (ID) associated with the single transmission channel based on the index value.

Example 161 is the method of Example 158 to 160, comprising identifying, based on the index value, a channel identifier (ID) associated with the single transmission channel and a channel ID associated with the primary channel.

Example 162 is the method of any of Examples 158 to 161, the single transmission channel to comprise a bandwidth of 2.16 GHz.

Example 163 is the method of Example 162, a channel identifier (ID) associated with the single transmission channel to match a channel ID associated with the primary channel.

Example 164 is the method of any of Examples 158 to 161, the single transmission channel to comprise a bandwidth of 4.32 GHz.

Example 165 is the method of any of Examples 158 to 161, the single transmission channel to comprise a bandwidth of 6.48 GHz.

Example 166 is the method of any of Examples 158 to 161, the single transmission channel to comprise a bandwidth of 8.64 GHz.

Example 167 is the method of any of Examples 155 to 157, the channel usage configuration to designate two transmission channels.

Example 168 is the method of Example 167, comprising determining respective associated channel identifiers (IDs) of the two transmission channels based on the index value.

Example 169 is the method of Example 168, comprising determining, based on the index value, the respective associated channel IDs of the two transmission channels and a channel ID associated with the primary channel.

Example 170 is the method of any of Examples 167 to 169, the two transmission channels to comprise bandwidths of 2.16 GHz.

Example 171 is the method of any of Examples 155 to 170, the field to comprise a six-bit field.

Example 172 is the method of any of Examples 155 to 170, the field to comprise a five-bit field.

Example 173 is at least one non-transitory computer-readable storage medium comprising a set of instructions that, in response to being executed on a computing device, cause the computing device to perform a method according to any of Examples 155 to 172.

Example 174 is an apparatus, comprising means for performing a method according to any of Examples 155 to 172.

Example 175 is a system, comprising the apparatus of Example 174, and at least one radio frequency (RF) transceiver.

Example 176 is the system of Example 175, comprising at least one processor.

Example 177 is the system of any of Examples 175 to 176, comprising at least one RF antenna.

Example 178 is a method, comprising identifying, at a wireless communication device, an index value comprised in a PHY header for a packet to be received from a remote device, identifying a channel usage configuration corresponding to the index value, the channel usage configuration to designate one or more transmission channels and a primary channel, and applying the channel usage configuration for reception of a data field of the packet via the one or more transmission channels.

Example 179 is the method of Example 178, the channel usage configuration to designate a single transmission channel.

Example 180 is the method of Example 179, comprising determining, based on the index value a channel identifier (ID) associated with the single transmission channel, and a channel ID associated with the primary channel.

Example 181 is the method of any Examples 179 to 180, the single transmission channel to comprise a bandwidth of 2.16 GHz, 4.32 GHz, 6.48 GHz, or 8.64 GHz.

Example 182 is the method of Example 178, comprising determining, based on the index value first and second channel identifiers (IDs) associated with dual transmission channels designated by the channel usage configuration, and a channel ID associated with the primary channel.

Example 183 is the method of any of Examples 178 to 182, the field to comprise a six-bit field.

Example 184 is at least one non-transitory computer-readable storage medium comprising a set of instructions that, in response to being executed on a computing device, cause the computing device to perform a method according to any of Examples 178 to 183.

Example 185 is an apparatus, comprising means for performing a method according to any of Examples 178 to 183.

Example 186 is a system, comprising the apparatus of Example 185, and at least one radio frequency (RF) transceiver.

Example 187 is the system of Example 186, comprising at least one processor.

Example 188 is the system of any of Examples 186 to 187, comprising at least one RF antenna.

Example 189 is an apparatus, comprising means for determining, at a wireless communication device, a channel usage configuration to be applied for a transmission of a packet to a remote device, the channel usage configuration to designate one or more transmission channels and a primary channel, means for identifying an index value corresponding to the channel usage configuration, and means for generating a PHY header for the packet, the PHY header to comprise a field containing the identified index value.

Example 190 is the apparatus of Example 189, comprising means for determining a channel identifier (ID) associated with the primary channel, and means for identifying the index value based at least in part on the channel ID associated with the primary channel.

Example 191 is the apparatus of any of Examples 189 to 190, the primary channel to comprise a bandwidth of 2.16 GHz.

Example 192 is the apparatus of any of Examples 189 to 191, the channel usage configuration to designate a single transmission channel.

Example 193 is the apparatus of Example 192, comprising means for determining a bandwidth of the single transmission channel, and means for identifying the index value based at least in part on the bandwidth of the single transmission channel.

Example 194 is the apparatus of Example 193, comprising means for determining an offset value based on the bandwidth of the single transmission channel, and means for identifying the index value based at least in part on the offset value.

Example 195 is the apparatus of any of Examples 192 to 194, comprising means for determining a channel identifier (ID) associated with the single transmission channel, and means for identifying the index value based at least in part on the channel ID associated with the single transmission channel.

Example 196 is the apparatus of any of Examples 192 to 195, comprising means for determining a bandwidth of the single transmission channel, means for determining an offset value based on the bandwidth of the single transmission channel, means for determining a channel identifier (ID) associated with the single transmission channel, and means for identifying the index value based at least in part on the offset value and the channel ID associated with the single transmission channel.

Example 197 is the apparatus of Example 196, comprising means for identifying the index value based at least in part on the offset value, the channel ID associated with the single transmission channel, and a channel ID associated with the primary channel.

Example 198 is the apparatus of any of Examples 192 to 197, the single transmission channel to comprise a bandwidth of 2.16 GHz.

Example 199 is the apparatus of Example 198, a channel identifier (ID) associated with the single transmission channel to match a channel ID associated with the primary channel.

Example 200 is the apparatus of any of Examples 192 to 197, the single transmission channel to comprise a bandwidth of 4.32 GHz.

Example 201 is the apparatus of any of Examples 192 to 197, the single transmission channel to comprise a bandwidth of 6.48 GHz.

Example 202 is the apparatus of any of Examples 192 to 197, the single transmission channel to comprise a bandwidth of 8.64 GHz.

Example 203 is the apparatus of any of Examples 189 to 191, the channel usage configuration to designate two transmission channels.

Example 204 is the apparatus of Example 203, comprising means for determining an offset value associated with a dual-channel transmission mode, and means for identifying the index value based at least in part on the offset value.

Example 205 is the apparatus of any of Examples 203 to 204, comprising means for determining respective associated channel identifiers (IDs) of the two transmission channels, and means for identifying the index value based at least in part on the respective associated channel IDs of the two transmission channels.

Example 206 is the apparatus of Example 205, comprising means for determining an offset value associated with a dual-channel transmission mode, means for determining respective associated channel identifiers (IDs) of the two transmission channels, and means for identifying the index value based at least in part on the offset value and the respective associated channel IDs of the two transmission channels.

Example 207 is the apparatus of Example 206, comprising means for identifying the index value based at least in part on the offset value, the respective associated channel IDs of the two transmission channels, and a channel ID associated with the primary channel.

Example 208 is the apparatus of any of Examples 203 to 207, the two transmission channels to comprise bandwidths of 2.16 GHz.

Example 209 is the apparatus of any of Examples 189 to 208, the field to comprise a six-bit field.

Example 210 is the apparatus of any of Examples 189 to 208, the field to comprise a five-bit field.

Example 211 is a system, comprising an apparatus according to any of Examples 189 to 210, and at least one radio frequency (RF) transceiver.

Example 212 is the system of Example 211, comprising at least one processor.

Example 213 is the system of any of Examples 211 to 212, comprising at least one RF antenna.

Example 214 is an apparatus, comprising means for determining, at a wireless communication device, a channel usage configuration to be applied for a transmission of a packet to a remote device, the channel usage configuration to designate one or more transmission channels and a primary channel, means for identifying an index value corresponding to the channel usage configuration, and means for generating a PHY header for the packet, the PHY header to comprise a field indicating the index value.

Example 215 is the apparatus of Example 214, the channel usage configuration to designate a single transmission channel.

Example 216 is the apparatus of Example 215, comprising means for determining an offset value based on a bandwidth of the single transmission channel, and means for identifying the index value based on the offset value, a channel identifier (ID) associated with the single transmission channel, and a channel ID associated with the primary channel.

Example 217 is the apparatus of any of Examples 214 to 216, the single transmission channel to comprise a bandwidth of 2.16 GHz, 4.32 GHz, 6.48 GHz, or 8.64 GHz.

Example 218 is the apparatus of Example 214, comprising means for identifying the index value based on an offset value associated with a dual-channel transmission mode according to which first and second transmission channels are to be used to transmit the packet, a channel identifier (ID) associated with the first transmission channel, a channel ID associated with the second transmission channel, and a channel ID associated with the primary channel.

Example 219 is the apparatus of any of Examples 214 to 218, the field to comprise a six-bit field.

Example 220 is a system, comprising an apparatus according to any of Examples 214 to 219, and at least one radio frequency (RF) transceiver.

Example 221 is the system of Example 220, comprising at least one processor.

Example 222 is the system of any of Examples 220 to 221, comprising at least one RF antenna.

Example 223 is an apparatus, comprising means for identifying, at a wireless communication device, an index value comprised in a PHY header for a packet to be received from a remote device, means for identifying a channel usage configuration corresponding to the index value, the channel usage configuration to designate one or more transmission channels and a primary channel, and means for applying the channel usage configuration for reception of a data field of the packet.

Example 224 is the apparatus of Example 223, comprising means for determining a channel identifier (ID) associated with the primary channel based on the index value.

Example 225 is the apparatus of any of Examples 223 to 224, the primary channel to comprise a bandwidth of 2.16 GHz.

Example 226 is the apparatus of any of Examples 223 to 225, the channel usage configuration to designate a single transmission channel.

Example 227 is the apparatus of Example 226, comprising means for determining a bandwidth of the single transmission channel based on the index value.

Example 228 is the apparatus of any of Examples 226 to 227, comprising means for determining a channel identifier (ID) associated with the single transmission channel based on the index value.

Example 229 is the apparatus of Example 226 to 228, comprising means for identifying, based on the index value, a channel identifier (ID) associated with the single transmission channel and a channel ID associated with the primary channel.

Example 230 is the apparatus of any of Examples 226 to 229, the single transmission channel to comprise a bandwidth of 2.16 GHz.

Example 231 is the apparatus of Example 230, a channel identifier (ID) associated with the single transmission channel to match a channel ID associated with the primary channel.

Example 232 is the apparatus of any of Examples 226 to 229, the single transmission channel to comprise a bandwidth of 4.32 GHz.

Example 233 is the apparatus of any of Examples 226 to 229, the single transmission channel to comprise a bandwidth of 6.48 GHz.

Example 234 is the apparatus of any of Examples 226 to 229, the single transmission channel to comprise a bandwidth of 8.64 GHz.

Example 235 is the apparatus of any of Examples 223 to 225, the channel usage configuration to designate two transmission channels.

Example 236 is the apparatus of Example 235, comprising means for determining respective associated channel identifiers (IDs) of the two transmission channels based on the index value.

Example 237 is the apparatus of Example 236, comprising means for determining, based on the index value, the respective associated channel IDs of the two transmission channels and a channel ID associated with the primary channel.

Example 238 is the apparatus of any of Examples 235 to 237, the two transmission channels to comprise bandwidths of 2.16 GHz.

Example 239 is the apparatus of any of Examples 223 to 238, the field to comprise a six-bit field.

Example 240 is the apparatus of any of Examples 223 to 238, the field to comprise a five-bit field.

Example 241 is a system, comprising an apparatus according to any of Examples 223 to 240, and at least one radio frequency (RF) transceiver.

Example 242 is the system of Example 241, comprising at least one processor.

Example 243 is the system of any of Examples 241 to 242, comprising at least one RF antenna.

Example 244 is an apparatus, comprising means for identifying, at a wireless communication device, an index value comprised in a PHY header for a packet to be received from a remote device, means for identifying a channel usage configuration corresponding to the index value, the channel usage configuration to designate one or more transmission channels and a primary channel, and means for applying the channel usage configuration for reception of a data field of the packet via the one or more transmission channels.

Example 245 is the apparatus of Example 244, the channel usage configuration to designate a single transmission channel.

Example 246 is the apparatus of Example 245, comprising means for determining, based on the index value a channel identifier (ID) associated with the single transmission channel, and a channel ID associated with the primary channel.

Example 247 is the apparatus of any Examples 245 to 246, the single transmission channel to comprise a bandwidth of 2.16 GHz, 4.32 GHz, 6.48 GHz, or 8.64 GHz.

Example 248 is the apparatus of Example 244, comprising means for determining, based on the index value first and second channel identifiers (IDs) associated with dual transmission channels designated by the channel usage configuration, and a channel ID associated with the primary channel.

Example 249 is the apparatus of any of Examples 244 to 248, the field to comprise a six-bit field.

Example 250 is a system, comprising an apparatus according to any of Examples 244 to 249, and at least one radio frequency (RF) transceiver.

Example 251 is the system of Example 250, comprising at least one processor.

Example 252 is the system of any of Examples 250 to 251, comprising at least one RF antenna.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
   a memory; and
   a processing circuit coupled with the memory to:
   generate a packet comprising a physical layer (PHY) header and a data portion, the processing circuit to:
   determine a channel usage configuration to be applied to transmit the data portion of the packet, the channel usage configuration to designate a transmission channel for the packet and a primary channel;
   identify an index value corresponding to the channel usage configuration, the index value based on a channel identifier (ID) associated with the transmission channel, a channel ID associated with the primary channel, a communication bandwidth of the transmission channel, and a communication bandwidth of the primary channel; and
   generate the PHY header for the packet, the PHY header to comprise a field indicating the index value; and
   cause transmission of the packet on the transmission channel, wherein transmission of the data portion is in accordance with the channel usage configuration.

2. The apparatus of claim 1, the channel usage configuration to designate the transmission channel as a single transmission channel, the single transmission channel to comprise a bandwidth of 2.16 GHz, 4.32 GHz, 6.48 GHz, or 8.64 GHz.

3. The apparatus of claim 2, the primary transmission channel to comprise a bandwidth of 2.16 GHz.

4. The apparatus of claim 1, the field to comprise an eight-bit field.

5. The apparatus of claim 1, the channel usage configuration to designate first and second transmission channels to be used to transmit the packet according to a dual-channel transmission mode.

6. The apparatus of claim 5, the first and second transmission channels of the dual-channel transmission mode to comprise a bandwidth of 2.16 GHz+2.16 GHz.

7. The apparatus of claim 1, comprising at least one radio frequency (RF) transceiver.

8. An apparatus, comprising:
   a memory; and
   a processor circuit coupled with the memory to:
   receive at least part of a physical layer (PHY) header of a packet, the packet comprising a PHY header and a data portion, the processing circuit to:
   identify an index value comprised in a field of the PHY header for a data portion of the packet to be received, the index value based on a channel identifier (ID) associated with a transmission channel, a channel ID associated with a primary channel, a communication bandwidth of the transmission channel, and a communication bandwidth of the primary channel;
   determine a channel usage configuration corresponding to the index value, the channel usage configuration to designate the transmission channel for the packet and the primary channel; and
   apply the channel usage configuration for reception of a data field of the packet; and
   receive the data portion of the packet on the transmission channel, wherein transmission of the data portion is in accordance with the channel usage configuration.

9. The apparatus of claim 8, the channel usage configuration to designate the transmission channel as a single transmission channel, the single transmission channel to comprise a bandwidth of 2.16 GHz, 4.32 GHz, 6.48 GHz, or 8.64 GHz.

10. The apparatus of claim 9, the primary transmission channel to comprise a bandwidth of 2.16 GHz.

11. The apparatus of claim 8, the field to comprise an eight-bit field.

12. The apparatus of claim 8, the channel usage configuration to designate first and second transmission channels to be used to transmit the packet according to a dual-channel transmission mode.

13. The apparatus of claim 12, the first and second transmission channels of the dual-channel transmission mode to comprise a bandwidth of 2.16 GHz+2.16 GHz.

14. The apparatus of claim 8, comprising at least one radio frequency (RF) transceiver.

15. A non-transitory computer-readable storage medium comprising instructions that, in response to being executed by a processor circuit, cause the processor circuit to:
   generate a packet comprising a physical layer (PHY) header and a data portion, the processing circuit to:
   determine a channel usage configuration to be applied to transmit the data portion of the packet, the channel usage configuration to designate a transmission channel for the packet and a primary channel;
   identify an index value corresponding to the channel usage configuration, the index value based on a channel identifier (ID) associated with the transmission channel, a channel ID associated with the primary channel, a communication bandwidth of the transmission channel, and a communication bandwidth of the primary channel; and
   generate the PHY header for the packet, the PHY header to comprise a field indicating the index value; and
   cause transmission of the packet on the transmission channel, wherein transmission of the data portion is in accordance with the channel usage configuration.

16. The computer-readable storage medium of claim 15, the channel usage configuration to designate a single transmission channel.

17. The computer-readable storage medium of claim 16, the single transmission channel to comprise a bandwidth of 2.16 GHz, 4.32 GHz, 6.48 GHz, or 8.64 GHz.

18. The computer-readable storage medium of claim 15, the field to comprise an eight-bit field.

19. The computer-readable storage medium of claim 15, the channel usage configuration to designate first and second transmission channels to be used to transmit the packet according to a dual-channel transmission mode.

20. The computer-readable storage medium of claim 19, the first and second transmission channels of the dual-channel transmission mode to comprise a bandwidth of 2.16 GHz+2.16 GHz.

\* \* \* \* \*